United States Patent
Sercel et al.

(10) Patent No.: US 6,888,987 B2
(45) Date of Patent: May 3, 2005

(54) CYLINDRICAL PROCESSING OF OPTICAL MEDIA

(75) Inventors: Peter C. Sercel, Pasadena, CA (US); Kerry J. Vahala, San Gabriel, CA (US); David W. Vernooy, Monrovia, CA (US); Guido Hunziker, Monrovia, CA (US)

(73) Assignee: Xponent Photonics Inc, Monrovia, CA (US)

( * ) Notice: Subject to any disclaimer, the term of this patent is extended or adjusted under 35 U.S.C. 154(b) by 508 days.

(21) Appl. No.: 09/788,303

(22) Filed: Feb. 16, 2001

(65) Prior Publication Data

US 2004/0197051 A1 Oct. 7, 2004

Related U.S. Application Data

(60) Provisional application No. 60/183,499, filed on Feb. 17, 2000, and provisional application No. 60/226,147, filed on Aug. 18, 2000.

(51) Int. Cl.⁷ .............................. G02B 6/26; G02B 6/16
(52) U.S. Cl. .............................. 385/39; 385/30; 385/43; 385/123
(58) Field of Search ............................ 385/36, 123, 31, 385/43, 1, 30, 27, 39, 50, 2; 65/387

(56) References Cited

U.S. PATENT DOCUMENTS

| | | | |
|---|---|---|---|
| 4,798,438 A | | 1/1989 | Moore et al. |
| 4,820,008 A | | 4/1989 | Malvern |
| 4,932,989 A | * | 6/1990 | Presby ........................ 65/387 |
| 5,138,676 A | | 8/1992 | Stowe et al. |
| 5,281,247 A | | 1/1994 | Aikawa et al. |
| 5,343,490 A | | 8/1994 | McCall |
| 5,471,551 A | | 11/1995 | Kragl et al. |
| 5,586,205 A | | 12/1996 | Chen et al. |
| 5,639,512 A | | 6/1997 | Nonaka et al. |
| 5,729,641 A | | 3/1998 | Chandonnet et al. |
| 5,751,242 A | | 5/1998 | Goutzoulis et al. |
| 5,928,525 A | | 7/1999 | Ohtsu et al. |
| 6,084,998 A | | 7/2000 | Straayer |
| 6,101,300 A | | 8/2000 | Fan et al. |
| 2002/0081055 A1 | | 6/2002 | Painter et al. |

FOREIGN PATENT DOCUMENTS

| | | |
|---|---|---|
| EP | 0098102 | 1/1984 |
| FR | 2739195 | 3/1997 |

OTHER PUBLICATIONS

Sai T. Chu, Wugen Pan, Shinya Sato, Taro Kaneko, Brent E. Little, and Yasuo Kokubun, "Wavelength trimming of a microring resonator filter by means of a UV sensitive polymer overlay", IEEE Phonics Tech. Lett. vol. 11 p. 688 (1999).

U.S. Appl. No. 09/440,311, Vahala et al., filed Nov. 12, 1999.
U.S. Appl. No. 09/454,719, Vahala et al., filed Dec. 7, 1999.
U.S. Appl. No. 09/733,357, Yariv, filed Dec. 7, 2000.

(Continued)

*Primary Examiner*—Frank G. Font
*Assistant Examiner*—Michael P. Mooney
(74) *Attorney, Agent, or Firm*—David S. Alavi; Scott R. Miller; Christie Parker & Hale LLP

(57) ABSTRACT

A method for cylindrical processing of an optical medium, including optical fiber and optical materials of substantially cylindrical form. The method of the preferred embodiments includes the steps of rotating an optical medium about a longitudinal relative rotation axis thereof relative to a processing tool; spatially selectively applying the processing tool to a portion of a surface of the optical medium in operative cooperation with relative rotation of the optical medium and the processing tool, thereby producing a patterned (i.e., spatially selective) structural alteration of the optical medium, the pattern including altered, differentially-altered and unaltered portions of the optical medium. Specialized techniques for spatially selectively generating the structural alteration may include masking/etching, masking/deposition, machining or patterning with lasers or beams, combinations thereof, and/or functional equivalents thereof.

110 Claims, 17 Drawing Sheets

OTHER PUBLICATIONS

U.S. Appl. No. 09/802,442, Painter et al., filed Mar. 9, 2001.
U.S. provisional application No. 60/183,499, Sercel et al., filed Feb. 17, 2000.
U.S. provisional application No. 60/226,147, Sercel et al., filed Aug. 18, 2000.
U.S. provisional application No. 60/257,248, Painter et al., filed Dec. 21, 2000.
U.S. Appl. No. 09/788,331, Sercel et al., filed Feb. 16, 2001.
U.S. Appl. No. 09/788,300, Vahela et al., filed Feb. 16, 2001.
U.S. Appl. No. 09/788,301, Sercel et al., filed Feb. 16, 2001.
J. C. Knight, G. Cheung, F. Jacques, and T. A. Birks, "Phased–matched excitation of whispering gallery–mode resonances by a fiber taper", Optics Letters vol. 22 1129 (1997).
Andreas Othonos, "Fiber Bragg gratings", Rev. Sci. Instrum. vol. 68(12) 4309 (1997).
G. Meltz et al., "Bragg grating formation and germanosilicate fiber photosensitivity", SPPIE vol. 1516 Int. Workshop on Photoinduced Self–organization in Optical Fiber (1991).
T. Erdogan, V. Mizrahi, P. J. Lemaire, and D. Monroe, "Decay of UV–induced fiber Bragg gratings", J. Appl. Phys. vol. 76 73 (1994).
H. M. Presby, A. F. Benner, and C. A. Edwards, "Laser micromachining of efficient fiber microlenses", Applied Optics vol. 29(18) 2692 (1990).
G. Elsenstein and D. Vitello, "Chemically etched conical microlenses for coupling single–mode lasers into single–mode fibers", Applied Optics vol. 21(19) 3470 (1981).
D. S. Starodubov, V. Grubsky, Jack Feinberg, B. Kobrin, and S. Juma, "Bragg grating fabrication in germanosilicate fibers by use of near–UV light: a new pathway for refractive index changes", Optics Letters, vol. 22(14) 1086 (1997).

K. O. Hill, B. Malo, F. Bilodeau, D. C. Johnson, and J. Albert, "Bragg gratings fabricated in monomode photosensitive optical fiber by UV exposure through a phase mask", Appl. Phys. Lett., vol. 62(10) 1035 (1993).
K. O. Hill, F. Bilodeau, B. Malo, T. Kitagawa, S. Theriault, D. C. Johnson, J. Albert, and K. Takiguchi, "Chirped in–fiber Bragg gratings for compensation of optical–fiber dispersion", Optics Letters, vol. 19(17) 1314 (1994).
S. V. Frolov, Z. V. Vardeny, and K. Yoshino, "Plastic microring lasers on fibers and wires", Applied Physics Letters vol. 72(15) 1802 (1998).
S. V. Frolov, A. Fujii, D. Chinn, Z. V. Vardeny, K. Yoshino, and R. V. Gregory, "Cylindrical microlasers and light emitting devices from conducting polymers", Applied Physics Letters, vol. 72(22) 2811 (1998).
N. Dubreuil, J. C. Knight, D. K. Leventhal, V. Sandoghdar, J. Hare, and V. Lefevre, "Eroded monomode optical fiber for whispering–gallery mode excitation in fused–silica microspheres", Optics Lett. 20 813 (1995).
M. Kuwata–Gonokami R. H. Jordan, A. Dodabalapur, H. E. Katz, M. L. Schilling, R. E. Slusher, and S. Ozawa, "Polymer microdisk and microrong lasers", Optics Letters vol. 20(20) 2903 (1995).
Y. Kawabe, Ch. Spiegelberg, A. Schulzgen, M. F. Nabor, B. Kippelen, E. A. Mash P. M. Allemand, M. Kuwata–Gonokami, K. Takeda, and N. Peyghambarian, "Whispering–gallery–mode microring laser using a conjugated polymer", Applied Physics Letters vol. 72(2) 141 (1998).

* cited by examiner

Structure

Filter function frequency frequency frequency frequency

CYLINDRICAL PROCESSING OF OPTICAL MEDIA

RELATED APPLICATIONS

This application claims benefit of prior filed now abandoned provisional Application No. 60/183,499 entitled "Resonant optical power control devices and methods of fabrication thereof" filed Feb. 17, 2000 in the names of Peter C. Sercel and Kerry J. Vahala, said provisional application being hereby incorporated by reference as if fully set forth herein. This application claims benefit of prior filed now abandoned provisional Application No. 60/226,147 entitled "Fiber-optic waveguides for evanescent optical coupling and methods of fabrication and use thereof", filed Aug. 18, 2000 in the names of Peter C. Sercel, Guido Hunziker, and Robert B. Lee, said provisional application being hereby incorporated by reference as if fully set forth herein.

GOVERNMENT RIGHTS

The U.S. Government may have limited rights in this application pursuant to Office of Naval Research Contract No. N00014-00-1-0072 via California Institute of Technology Subcontract No. 1008921.

FIELD OF THE INVENTION

The field of the present invention relates to optical fiber communications. In particular, novel optical components, and methods of fabrication and use thereof, are described herein for modulating, switching, routing, and otherwise controlling optical signals in a wavelength specific manner.

BACKGROUND

This application is related to subject matter disclosed in:
A1) U.S. provisional Application No. 60/111,484 entitled "An all-fiber-optic modulator" filed Dec. 07, 1998 in the names of Kerry J. Vahala and Amnon Yariv, said provisional application being hereby incorporated by reference in its entirety as if fully set forth herein;

A2) U.S. application Ser. No. 09/454,719 entitled "Resonant optical wave power control devices and methods" filed Dec. 07, 1999 in the names of Kerry J. Vahala and Amnon Yariv, said application being hereby incorporated by reference in its entirety as if fully set forth herein;

A3) U.S. provisional Application No. 60/108,358 entitled "Dual tapered fiber-microsphere coupler" filed Nov. 13, 1998 in the names of Kerry J. Vahala and Ming Cai, said provisional application being hereby incorporated by reference in its entirety as if fully set forth herein;

A4) U.S. application Ser. No. 09/440,311 entitled "Resonator fiber bi-directional coupler" filed Nov. 12, 1999 in the names of Kerry J. Vahala, Ming Cai, and Guido Hunziker, said application being hereby incorporated by reference in its entirety as if fully set forth herein; and A5) U.S. provisional Application No. 60/183,499 entitled "Resonant optical power control devices and methods of fabrication thereof" filed Feb. 17, 2000 in the names of Peter C. Sercel and Kerry J. Vahala, said provisional application being hereby incorporated by reference in its entirety as if fully set forth herein.

A6) U.S. provisional application entitled "Fiber-optic waveguides for evanescent optical coupling and methods of fabrication and use thereof", filed Aug. 18, 2000 in the names of Peter C. Sercel, Guido Hunziker, and Robert B. Lee, Application No. 60/226,147, said provisional application being hereby incorporated by reference in its entirety as if fully set forth herein.

A7) U.S. provisional Application No. 60/257,248 entitled "Modulators for resonant optical power control devices and methods of fabrication and use thereof" filed Dec. 21, 2000 in the names of Oskar J. Painter, Peter C. Sercel, Kerry J. Vahala, and Guido Hunziker, said provisional application being hereby incorporated by reference as if fully set forth herein.

A8) U.S. provisional application entitled "Waveguides and resonators for integrated optical devices and methods of fabrication and use thereof", filed Dec. 21, 2000 in the name of Oskar J. Painter, Application No. 60/257,218, said provisional application being hereby incorporated by reference as if fully set forth herein.

A10). U.S. utility patent application Ser. No. 09/788,331 entitled "Fiber-ring optical resonators" filed concurrently with the present application in the names of Peter C. Sercel, Kerry J. Vahala, David W. Vernooy, and Guido Hunziker, said application being hereby incorporated by reference as if fully set forth herein.

A11). U.S. utility patent application Ser. No. 09/788,300 entitled "Resonant optical filter" filed concurrently with the present application in the names of Kerry J. Vahala, Peter C. Sercel, David W. Vernooy, Oskar J. Painter, and Guido Hunziker, and said application being hereby incorporated by reference as if fully set forth herein.

A12). U.S. utility patent application Ser. No. 09/788,301 entitled "Resonant optical power control device assemblies" filed concurrently with the present application in the names of Peter C. Sercel, Kerry J. Vahala, David W. Vernooy, Guido Hunziker, Robert B. Lee, and Oskar J. Painter, said application being hereby incorporated by reference as if fully set forth herein.

A13) U.S. provisional Application No. 60/170,074 entitled "Optical routing/switching based on control of waveguide-ring resonator coupling", filed Dec. 09, 1999 in the name of Amnon Yariv, said provisional application being hereby incorporated by reference in its entirety as if fully set forth herein.

A14) U.S. Pat. No. 6,052,495 entitled "Resonator modulators and wavelength routing switches" issued Apr. 18, 2000 in the names of Brent E. Little, James S. Foresi, and Hermann A. Haus, said patent being hereby incorporated by reference in its entirety as if fully set forth herein.

A15) U. S. Pat. No. 6,101,300 entitled "High efficiency channel drop filter with absorption induced on/off switching and modulation" issued Aug. 08, 2000 in the names of Shanhui Fan, Pierre R. Villeneuve, John D. Joannopoulos, Brent E. Little, and Hermann A. Haus, said patent being hereby incorporated by reference in its entirety as if fully set forth herein.

This application is also related to subject matter disclosed in the following 17 publications, each of said 17 publications being hereby incorporated by reference in its entirety as if fully set forth herein:

P1) Ming Cai, Guido Hunziker, and Kerry Vahala, "Fiber-optic add-drop device based on a silica microsphere whispering gallery mode system", IEEE Photonics Technology Letters Vol. 11 686 (1999);

P2) J. C. Knight, G. Cheung, F. Jacques, and T. A. Birks, "Phased-matched excitation of whispering gallery-mode resonances by a fiber taper", Optics Letters Vol. 22 1129 (1997);

P3) Hiroshi Wada, Takeshi Kamijoh, and Yoh Ogawa, "Direct bonding of InP to different materials for optical devices", Proceedings of the third international symposium on semiconductor wafer bonding: Physics and applications, Electrochemical Society Proceedings, Princeton NJ., Vol. 95–7, 579–591 (1995).

P4) R. H. Horng, D. S. Wuu, S. C. Wei, M. F. Huang, K. H. Chang, P. H. Liu, and K. C. Lin, "AlGaInP/AuBe/glass light emitting diodes fabricated by wafer-bonding technology", Appl. Phys. Letts. Vol. 75(2) 154 (1999).

P5) Y. Shi, C. Zheng,H. Zhang, J. H. Bechtel, L. R. Dalton, B. B. Robinson, W. Steier, "Low (sub-1-volt) halfwave voltage polymeric electro-optic modulators achieved by controlling chromophore shape", Science Vol. 288, 119 (2000).

P6) E. L. Wooten, K. M. Kissa, and A. Yi-Yan, "A review of lithium niobate modulators for fiber-optic communications systems", IEEE J. Selected Topics in Quantum Electronics, Vol. 6(1), 69 (2000).

P7) D. L. Huffaker, H. Deng, Q. Deng, and D. G. Deppe, "Ring and stripe oxide-confined vertical-cavity surface-emitting lasers", Appl. Phys. Lett., Vol. 69(23), 3477 (1996).

P8) Serpenguzel, S. Arnold, and G. Griffel, "Excitation of resonances of microspheres on an optical fiber", Opt. Lett. Vol. 20, 654 (1995);

P9) F. Treussart, N. Dubreil, J. C. Knight, V. Sandoghar, J. Hare, V. Lefevre-Seguin, J. M. Raimond, and S. Haroche, "Microlasers based on silica microspheres", Ann. Telecommun. Vol. 52, 557 (1997); and P10) M. L. Gorodetsky, A. A. Savchenkov, V. S. Ilchenko, "Ultimate Q of optical microsphere resonators", Optics Letters, Vol. 21, 453 (1996).

P11) Ming Cai, Oskar Painter, and Kerry J. Vahala, "Observation of critical coupling in a fiber taper to a silica-microsphere whispering-gallery mode system", Physical Review Letters, Vol. 85(1) 74 (2000).

P12) Andreas Othonos, "Fiber Bragg gratings", Rev. Sci. Instrum. Vol. 68(12) 4309(1997).

P13) B. A. Little, S. T. Chu, H. A. Haus, J. Foresi, and J.-P. Laine, "Microring channel dropping filters", J. Lightwave Technology Vol. 15 998 (1997).

P14) Giora Griffel, "Synthesis of optical filters using ring resonator arrays", IEEE Photonics Technology Letts. Vol. 12 810 (2000).

P15) G. Metz et al., <<Bragg grating formation and germanosilicate fiber photosensitivity", SPPIE Vol 1516 Int. Workshop on Photoinduced Self-organization in Optical Fiber (1991).

P16) T. Erdogan, V. Mizrahi, P. J. Lemaire, and D. Monroe, "Decay of UV-induced fiber Bragg gratings", J. Appl. Phys. Vol. 76 73 (1994).

P17) Wei Xu, Mank Janos, Danny Wong, Simon Fleming, "Thermal poling of boron-codoped germanosilicate", IEICE Trans. Electron., Vol E82-C(8) 1549 (1999).

Optical fiber and propagation of high-data-rate optical pulse trains therethrough has become the technology of choice for high speed telecommunications. Wavelength division multiplexing (WDM) techniques are now commonly used to independently transmit a plurality of signals over a single optical fiber, independent data streams being carried by optical fields propagating through the optical fiber at a slightly differing optical carrier wavelengths (i.e., signal channels). WDM techniques include dense wavelength division multiplexing (DWDM) schemes, wherein the frequency spacing between adjacent signal channels may range from a few hundred GHz down to a few GHz. A propagating mode of a particular wavelength must be modulated, independently of other propagating wavelengths, in order to carry a signal. A signal carried by a particular wavelength channel must be independently accessible for routing from a particular source to a particular destination. These requirements have previously required complex and difficult-to-manufacture modulating and switching devices requiring extensive active alignment procedures during fabrication/assembly, and as a result are quite expensive. Such devices may require conversion of the optical signals to electronic signals and/or vice versa, which is quite power consuming and inefficient. In the patent applications A1 through A14 cited above a new approach has been disclosed for controlling optical power transmitted through an optical fiber that relies on the use of resonant circumferential-mode optical resonators, or other optical resonators, for direct optical coupling to a propagating mode of an optical fiber resonant with the optical resonator, thereby enabling wavelength-specific modulation, switching, and routing of optical signals propagating through the optical fiber. A thorough discussion of the features and advantages of such optical power control devices and techniques, as well as methods of fabrication, may be found in these applications, already incorporated by reference herein.

One important element of these latter devices is optical coupling between a fiber-optic waveguide and a circumferential-mode optical resonator. The circumferential-mode optical resonator provides wavelength specificity, since only propagating optical modes substantially resonant with the circumferential-mode optical resonator will be significantly affected by the device. A fiber-optic waveguide for transmitting the optical signal through the control device is typically provided with an evanescent optical coupling segment, where an evanescent portion of the propagating optical mode extends beyond the waveguide and overlaps a portion of a circumferential optical mode of the circumferential-mode optical resonator, thereby optically coupling the circumferential-mode optical resonator and the fiber-optic waveguide. The evanescent optical coupling segment may take one of several forms, including an optical fiber taper, D-shaped optical fiber, an optical fiber with a saddle-shaped concavity in the cladding layer, and/or other functionally equivalent configurations. These are discussed in detail in patent applications A1 through A7 cited herein.

The circumferential-mode optical resonator structure may comprise a glass micro-sphere or micro-disk, a fiber-ring resonator, a semiconductor ring/waveguide, or other functionally equivalent structure, described in detail in earlier-cited applications A1 through A8. A high-Q circumferential-mode optical resonator supports relatively narrow-linewidth resonant circumferential optical modes (i.e., having a linewidth consistent with typical linewidths of a WDM system, TDM system, or other optical data transmission system), which in an optical power control device may optically couple to propagating optical modes of the fiber-optic waveguide of substantially resonant optical wavelength. The circumferential-mode optical resonator therefore provides the wavelength selectivity of the optical power control device. Non-resonant propagating optical signals pass by the circumferential-mode optical resonator relatively undisturbed, and are transmitted through the device. The effect of the device on a substantially resonant signal channels depends on the nature of the control device.

A resonant optical filter may be constructed by coupling a second optical waveguide to the resonator to a similar degree that the fiber-optic waveguide is optically coupled to the resonator. In this case a critical-coupling condition exists between the resonator and fiber-optic waveguide, and for this condition substantially all of the resonant optical signal will be transferred from the fiber-optic waveguide to the second waveguide. Such a configuration is useful for constructing channel slicer/interleavers or channel add/drop filters for WDM and/or WDM optical transmission systems. Such a device enables wavelength-specific routing of one or more resonant signal channels among group of signal channels.

Alternatively, a resonant optical modulator or switch may be constructed by providing the circumferential-mode optical resonator with an optical loss mechanism that may be actively controlled or modulated. By modulating the resonator loss between critical-coupling and either over- or under-coupling, the transmission of a resonant signal channel may be selectively modulated between near-zero transmission and non-zero transmission. Since the circumferential-mode optical resonator provides wavelength (i.e., signal channel) specificity, the optical loss mechanism need not be wavelength specific.

It is therefore desirable to provide resonant optical power control devices for providing wavelength specific modulation of an optical signal channel. It is therefore desirable to provide resonant optical power control devices for providing wavelength specific routing of an optical signal channel. It is desirable to provide fiber-ring resonators for incorporation into resonant optical power control devices as the circumferential mode optical resonator. It is therefore desirable to provide cylindrical processing methods for fabricating components for optical power control devices, including fiber-ring resonators. It is therefore desirable to provide device assembly methods and configurations for resonant optical power control devices.

SUMMARY

Certain aspects of the present invention may overcome one or more aforementioned drawbacks of the previous art and/or advance the state-of-the-art of optical power control devices and fabrication thereof, and in addition may meet one or more of the following objects:

To provide cylindrical processing methods and apparatus for processing optical media;

To provide cylindrical processing methods and apparatus wherein rings and partial rings may be machined onto an optical fiber;

To provide cylindrical processing methods and apparatus for producing a fiber-ring optical resonator;

To provide delocalized-optical-mode suppressors for substantially eliminating undesirable optical resonance of the fiber-ring and/or optical fiber;

To provide cylindrical processing methods and apparatus for producing fiber-taper positioner on an optical fiber;

To provide a resonant optical power control device that may be reliably and reproducibly fabricated;

To provide a resonant optical power control device that may be reliably and reproducibly fabricated without resorting to active alignment procedures;

To provide a resonant optical power control device with low insertion loss;

To provide a resonant optical power control device with a free spectral range suitable for use in WDM applications;

To provide a resonant optical power control device wherein an optical wave propagating through an optical fiber is coupled to a resonant circumferential-mode optical resonator;

To provide a method for fabricating a circumferential-mode optical resonator on the circumference of an optical fiber, thereby providing a fiber-ring resonator;

To provide a method for fabricating a circumferential-mode optical resonator on the circumference of an optical fiber by altering a circumferential optical pathlength (by altering diameter, refractive index, chemical composition, density, and so on) of a transverse resonator segment of the optical fiber;

To provide a method for fabricating an optical power control device wherein the optical fiber and the circumferential-mode resonator are positioned and secured within alignment grooves on an alignment substrate;

To provide a method for fabricating an optical power control device wherein the circumferential-mode resonator is provided with an alignment groove and/or flange for passive alignment within an alignment grooves on an alignment substrate;

To provide a method for fabricating an optical power control device wherein the optical fiber has a fiber taper segment for optically coupling to the circumferential-mode resonator;

To provide a method for fabricating an optical power control device wherein the optical fiber may be heated and pulled to form a fiber taper segment within an alignment groove on an alignment substrate; and To provide a method for fabricating an optical power control device wherein a fiber taper segment may be received by a fiber-taper positioner provided on or near the circumferential-mode optical resonator;

To provide a method for fabricating an optical power control device wherein a fiber taper segment may be wrapped around a circumferential-mode optical resonator;

To provide a method for fabricating a resonant optical filter by providing a second fiber-optic waveguide coupled to the circumferential-mode optical resonator; and To provide a method for fabricating a resonant optical modulator by providing a modulator for controlling optical properties of the circumferential-mode resonator.

One or more of the foregoing objects may be achieved in the present invention by a method for fabricating a circumferential-mode optical resonator on an optical fiber, comprising the step of generating a differential of a circumferential optical pathlength (by altering diameter, density, refractive index, chemical composition, and so forth) of a transverse resonator fiber segment relative to the longitudinally adjacent fiber segments. The resonator fiber segment may therefore substantially confine a circumferential optical mode propagating around the resonator fiber segment circumference at least partially within the resonator fiber segment. Specialized techniques for spatially selectively generating the differential may include masking/etching, masking/deposition, laser machining, laser patterning, combinations thereof, and/or functional equivalents thereof. The circumferential-mode resonator may be further provided with an alignment flange and/or groove for enabling passive positioning of the circumferential-mode resonator within an alignment groove of an alignment substrate. A preferred method for fabricating an optical power control device according to the present invention comprises the steps of: 1) fabricating a circumferential-mode resonator as described herein; 2) heating and pulling a transmission optical fiber to form a fiber taper segment; 3) fabricating an alignment substrate having a resonator-alignment groove and a fiber alignment groove thereon; 4) positioning and securing the fiber taper segment within the fiber-alignment groove; 5) positioning and securing the circumferential-mode resonator within the resonator-alignment groove so that the circumferential-mode resonator and the fiber taper segment are optically coupled (through close proximity and/or direct contact between them). The alignment grooves are fabricated at the correct depths and positions and with corresponding alignment grooves and/or flanges to enable the optical coupling without extensive active alignment procedures. Additional alignment structures and positioners may be provided to facilitate and adjust optical coupling of the circumferential-mode resonator and the fiber-optic taper. In a resonant optical filter, a second fiber-optic taper may be coupled to the resonator. In a resonant optical modulator, a modulator may be provided as an integral component of the circumferential-mode resonator, provided directly on the circumferential-mode resonator, or as a separate assembly positioned on and secured with respect to the alignment substrate. The modulator enables control of the optical properties of the circumferential-mode resonator, which in turn enables control of the optical power transmitted through the fiber taper segment of the transmission optical fiber.

Additional objects and advantages of the present invention may become apparent upon referring to the preferred and alternative embodiments of the present invention as illustrated in the drawings and described in the following written description and/or claims.

Figure 1A:
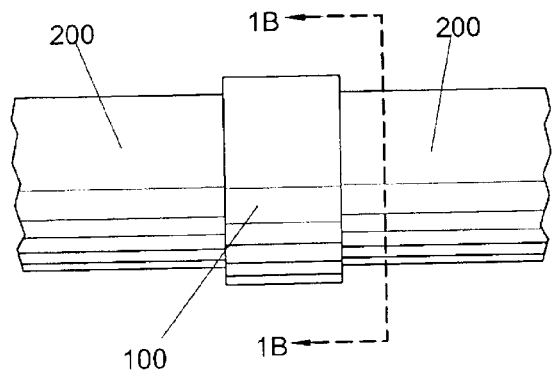
FIGS. 1A and 1B show side and transverse cross-sectional views, respectively, of a circumferential-mode optical resonator fabricated on an optical fiber according to the present invention.

It should be noted that the relative proportions of various structures shown in the Figures may be distorted to more clearly illustrate the present invention. In particular, the size differential and resonator thickness of fiber-rings may be greatly exaggerated relative to the underlying optical fiber diameter in various Figures for clarity. Various metal, semiconductor, and/or other thin films, layers, and/or coatings may also be shown having disproportionate and/or exaggerated thicknesses for clarity. Relative dimensions of various waveguides, resonators, optical fibers/tapers, and so forth may also be distorted, both relative to each other as well as transverse/longitudinal proportions. For example, several Figures showing a lateral view of a fiber-taper show the length of fiber over which the taper occurs much shorter than is actually the case. The text and incorporated references should be relied on for the appropriate dimensions and/or proportions of structures shown herein.

It should be noted that some of the Figures may each may depict one of several distinct embodiments of optical power control devices according to the present invention. Each set of embodiments corresponding to a particular Figure are similar in spatial arrangement, but differ in functional details that are not represented in the Figures. In particular, loss-modulated, index-modulated, resonance-modulated, interference-modulated embodiments may appear substantially similar in the Figures. The particular functional aspects of the different embodiments are described in different text sections that each refer to one or more common Figures.

DETAILED DESCRIPTION OF PREFERRED AND ALTERNATIVE EMBODIMENTS

For purposes of the present written description and/or claims, "circumferential-mode optical resonator" (equivalently, CMOR, CM optical resonator, CM resonator, CMR) shall denote a resonator structure capable of supporting a substantially resonant circumferential optical mode (equivalently, RCOM), the circumferential optical mode having an evanescent portion extending beyond the circumferential-mode optical resonator and typically being substantially confined near the surface of the resonator (near being defined here as within several microns for visible, near-, or mid-infrared circumferential optical modes). Such a resonator has been/is also often referred to as a whispering-gallery-mode optical resonator (near in this case. Such resonator structures may include, but are not limited to, spheres, near-spheres, oblate and/or prolate spheroids, ellipsoids, ovals, ovoids, racetracks, polygons, polyhedra, cylinders, disks, rings, micro-spheres, micro-disks, micro-rings, fiber-rings, disks and/or rings on substrates (including structures disclosed in earlier-cited application A8), ring or other closed waveguides, and/or functional equivalents thereof. In particular, the various circumferential-mode optical resonator structures as disclosed in earlier-cited application A5 (denoted collectively as "fiber-rings", fiber-ring resonator, or FRR's) are particularly noted for inclusion as circumferential-mode optical resonators for purposes of this disclosure. However, other resonator structures may be equivalently employed without departing from inventive concepts disclose and/or claimed herein. Any resonator having an evanescent portion of a resonant optical mode or that may otherwise be "evanescently optically coupled" to another optical element (see definition hereinbelow) may be employed as the resonant optical resonator element of the present invention (i.e., the element that confers wavelength specificity on the optical power control device). Optical resonator structures disclosed in earlier-cited application A8 (denoted collectively as "DBR rings") are particularly noted for inclusion as optical resonators suitable for use in the present invention. Although the term "circumferential-mode optical resonator" is used throughout the remainder of the present disclosure, it should be understood that any optical resonator that may be evanescently optically coupled to a transmission waveguide and/or to an optical modulator as disclosed herein shall be considered functionally equivalent to a circumferential-mode optical resonator.

It should also be noted that the terms "optical resonator", "circumferential-mode optical resonator", and so forth shall encompass both single optical resonators as well as coupled systems of multiple optical resonators, unless a single- or multiple-resonator device is specifically designated in the text.

For purposes of the present written description and/or claims, "transmission fiber-optic waveguide" (equivalently, transmission waveguide, transmission fiber-optic, transmission optical fiber, TFOWG, TWG) shall denote an optical fiber (polarization-maintaining or otherwise) provided with a evanescent optical coupling segment where an evanescent portion of a propagating optical mode may extend beyond the fiber-optic waveguide and overlap a portion of some other optical mode, thereby enabling evanescent optical coupling between the transmission optical waveguide and another optical element. Such a transmission optical waveguide may comprise an optical fiber taper, a D-shaped optical fiber, an optical fiber with a saddle-shaped concavity in the cladding layer, an optical fiber with a side-polished flattened portion, and/or functional equivalents. Such transmission optical waveguides are described in further detail in earlier-cited applications A1 through A6. Such transmission fiber-optic waveguides typically serve to facilitate insertion of optical power control devices according to the present invention into an optical power transmission system.

For purposes of the written description and/or claims, "evanescent optical coupling" shall generally denote those situations in which two optical elements, each capable of supporting a propagating and/or resonant optical mode and at least one having an evanescent portion extending beyond its respective optical element, are optically coupled by at least partial spatial overlap of the evanescent portion of one optical mode with at least a portion of the other optical mode. The amount, strength, level, or degree of optical power transfer from one optical element to the other through such evanescent optical coupling depends on the spatial extent of the overlap (both transverse and longitudinal), the spectral properties of the respective optical modes, and the relative spatial phase matching of the respective optical modes (also referred to as modal index matching). To transfer optical power most efficiently, the respective modal indices of the optical modes (equivalently, the respective modal propagation constants), each in its respective optical element, must be substantially equal. Mismatch between these modal indices decreases the amount of optical power transferred by evanescent coupling between the optical elements, since the coupled modes get further out of phase with each other as each propagates within its respective optical element and the direction of the optical power transfer eventually reverses itself. The propagation distance over which the modes interact (i.e., the effective interaction length) and the degree of index matching (or mismatching) together influence the overall flow of optical power between the coupled modes. Optical power transfer between the coupled modes oscillates with a characteristic amplitude and spatial period as the modes propagate, each in its respective optical element. Neglecting the effects of optical loss in the optical elements, an ideal system consisting of two coupled modes can be characterized by the following coupled system of equations:

$$\frac{\partial E_1}{\partial z} = i\beta_1 E_1 + i\kappa E_2$$

$$\frac{\partial E_2}{\partial z} = i\beta_2 E_2 + i\kappa^* E_1$$

Where the following definitions apply:
$E_{1,2}$ amplitudes of the coupled fields
$\beta_{1,2}$ propagation constants of the coupled fields
$\kappa$ coupling amplitude resulting from spatial overlap of the fields z propagation distance coordinate For the purpose of illustration, assume that the coupling amplitude κ is constant over an interaction distance L. Then, an incident field of amplitude $E_1$ that is spatially confined to the first optical element before interaction will couple to the other wave guide with a resultant field amplitude $E_2(L)$ at z=L (where we define z=0 as the start of the coupling region) given by the following expression, $$\frac{|E_2(L)|^2}{|E_1(0)|^2} = \frac{|\kappa|^2}{q^2}\sin^2(qL)$$

$$q^2 = |\kappa|^2 + \frac{1}{4}\Delta\beta^2$$

Consider the phase mismatch term ($\Delta\beta=\beta_2-\beta_1$) and the interaction length in this expression. As is well known, a condition of phase mismatch between the two spatial modes causes an oscillatory power transfer to occur between the waveguides as the interaction length is varied. The spatial period of this oscillation, a so-called "beat length", can be defined as the distance over which power cycles back and forth between the guides. Greater amounts of phase mismatch will reduce the beat length. Also note that the absolute magnitude of power transfer will diminish with increasing phase mismatch. Finally, it is apparent that increased amounts of interaction length will introduce an increased spectral selectivity to the power coupling.

By controlling the phase mismatch and/or transverse spatial overlap between optical modes, these characteristics may be exploited for controlling optical power transfer between optical elements. For example, by altering the phase mismatch, a device may be switched from a first condition, in which a certain fraction of optical power is transferred from a first optical mode in a first optical element to a second optical mode in a second optical element (phase mismatch set so that the effective interaction length is about half of the characteristic spatial period described above), to a second condition in which little or no optical power is transferred (phase mismatch set so that the effective interaction length is about equal to the characteristic spatial period). Further discussion of optical coupling may be found in *Fundamentals of Photonics* by B. E. A. Saleh and M. C. Teich (Wiley, New York, 1991), hereby incorporated by reference in its entirety as if fully set forth herein. Particular attention is called to Chapters 7 and 18.

It should be noted that optical power control devices, their fabrication, and their use according to the present invention are intended primarily for modulating a propagating optical mode having a wavelength between about 0.8 μm and about 1.7 μm (the wavelength range typically utilized for fiberoptic telecommunications). However, these devices, methods of fabrication, and methods of use may be adapted for use at any desired wavelength while remaining within the scope of inventive concepts disclosed and/or claimed herein.

In preferred and alternative methods for fabricating a circumferential-mode optical resonator as disclosed herein, an optical fiber (hereinafter including substantially cylindrical optical media) serves as the starting material for fabricating a ring-type circumferential-mode resonator; this fiber shall be referred to herein as the resonator fiber. Use of a ring or disk circumferential-mode resonator substantially eliminates the problem of closely-spaced modes that typically characterize nearly spherical circumferential-mode resonators. Use of an optical fiber as the starting material insures that the resulting circumferential-mode resonator will be substantially circular, and facilitates subsequent optical coupling to and/or phase matching with an optical fiber, and assembly/alignment of the circumferential-mode resonator as part of an optical power control device. The circumferential-mode resonator is fabricated by generating a differential of some physical property of the optical fiber between a transverse resonator segment of the optical fiber and the two longitudinally adjacent portions of the surrounding segments of the resonator optical fiber. The preferred property is a circumferential optical pathlength. The optical pathlength differential enables substantial confinement by the resonator segment of the resonator fiber of a substantially resonant circumferential-mode optical wave that propagates around the circumference of the fiber at least partially within the resonator segment. A portion of the circumferential-mode optical wave comprises an evanescent wave extending outside the resonator segment longitudinally and/or radially. The evanescent wave portion of the circumferential-mode optical wave enables optical coupling of the circumferential-mode optical resonator to other optical components and modification and/or control of the optical properties, behavior, and performance of the circumferential-mode optical resonator.

Figure 1B:
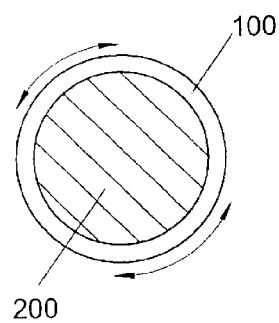
Figure 2A:
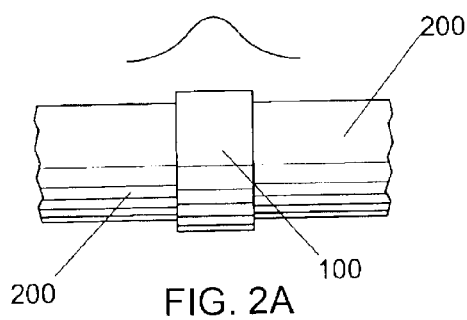
FIGS. 2A, 2B, and 2C show schematically intensity profiles for the three lowest order transverse circumferential modes of a circumferential-mode optical resonator on an optical fiber according to the present invention.
Figure 2B:
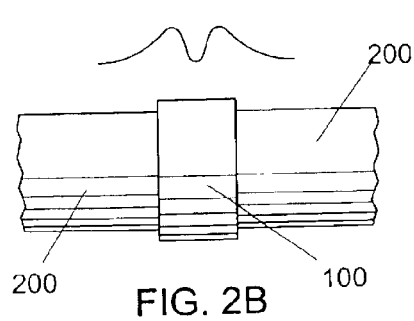
Figure 2C:
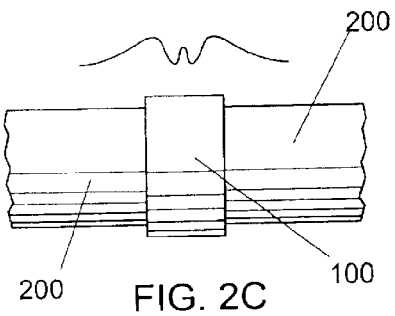

In a preferred method for fabricating the circumferential-mode resonator, the diameter is the property of the optical fiber for which a differential is generated, thereby yielding a longer circumferential optical pathlength for the resonator segment (FIGS. 1A and 1B). Optical fibers are commonly available commercially having a diameter of about 125 μm (higher refractive index core plus lower refractive index cladding, excluding any additional jacket material), and other diameters are available. For use in a resonant optical modulator according to the present invention, the finished circumferential-mode resonator may have a diameter ranging between about 10 μm and a few millimeters, preferably between about 20 μm and about 200 μm, and most preferably between about 100 μm and about 150 μm. For use in a resonant optical filter according to the present invention, the finished circumferential-mode resonator may have a diameter ranging between about 10 μm and a few millimeters, preferably between about 400 μm and about 1000 μm, and most preferably between about 500 μm and about 600 μm. For use in a resonant optical modulator according to the present invention, the finished circumferential-mode resonator may have radius differential (radius greater than the adjacent portion of the surrounding segments of the resonator fiber) ranging between about 0.1 μm and about 20 μm, preferably between about 0.5 μm and about 1.5 μm. For use in a resonant optical filter according to the present invention, the finished circumferential-mode resonator may have radius differential between about 0.1 μm and about 10 μm, preferably between about 0.1 and about 2 μm. These size differentials are generally sufficient to substantially confine a circumferential mode with minimum number of nodes along the fiber axis or in the radial direction at least partially within the resonator segment 100, while not confining higher-order modes as well (if at all). The thickness of the resonator segment 100 may range between about 1 μm and about 10 μm, preferably between about 2 μm and about 4 μm. This width is sufficient to support a circumferential mode with minimum number of nodes along the fiber axis or in the radial direction, which may extend longitudinally beyond the resonator segment, while not supporting higher-order circumferential-mode spatial modes as well. In particular, it has been observed that a circumferential-mode resonator having a diameter of about 125 μm, a size differential of 1–2 μm, and a resonator segment thickness of about 5 μm may support a circumferential mode with minimum number of nodes along the fiber axis or in the radial direction, but also higher-spatial-order circumferential-mode modes having planar nodal surfaces perpendicular to the axis of the resonator segment (FIGS. 2A, 2B, and 2C). These higher-spatial-order modes are frequency shifted with respect to the lowest-order mode, thereby degrading the frequency selectivity (i.e., decreased frequency spacing between modes) of the circumferential-mode resonator. This problem may be mitigated in several ways. In a first method, it has been observed that a smaller size differential between the resonator segment 100 and the adjacent portions 200 (between about 0.5 $\mu$m and about 1.5 $\mu$m) confines the circumferential optical modes more weakly than a larger size differential. This effect becomes substantially more pronounced for higher-spatial-order modes, which extend further beyond the resonator segment than lower-order modes as shown in FIGS. 2A through 2C. Sufficient reduction of the size differential results in substantial suppression of all higher-order modes. Alternatively, in a second method the thickness of the resonator segment may be reduced from about 5 $\mu$m to about 1 $\mu$m in order to remove higher order spatial modes. Alternatively, a larger resonator thickness (perhaps several 10's of microns) may be desirable for enabling optical coupling of multiple fibers to a single circumferential-mode resonator; or a plurality of resonators positioned on the same fiber sufficiently close together to enable optical coupling between them may be employed to provide a tailored frequency filter function for optically coupling multiple fibers.

Figure 3:
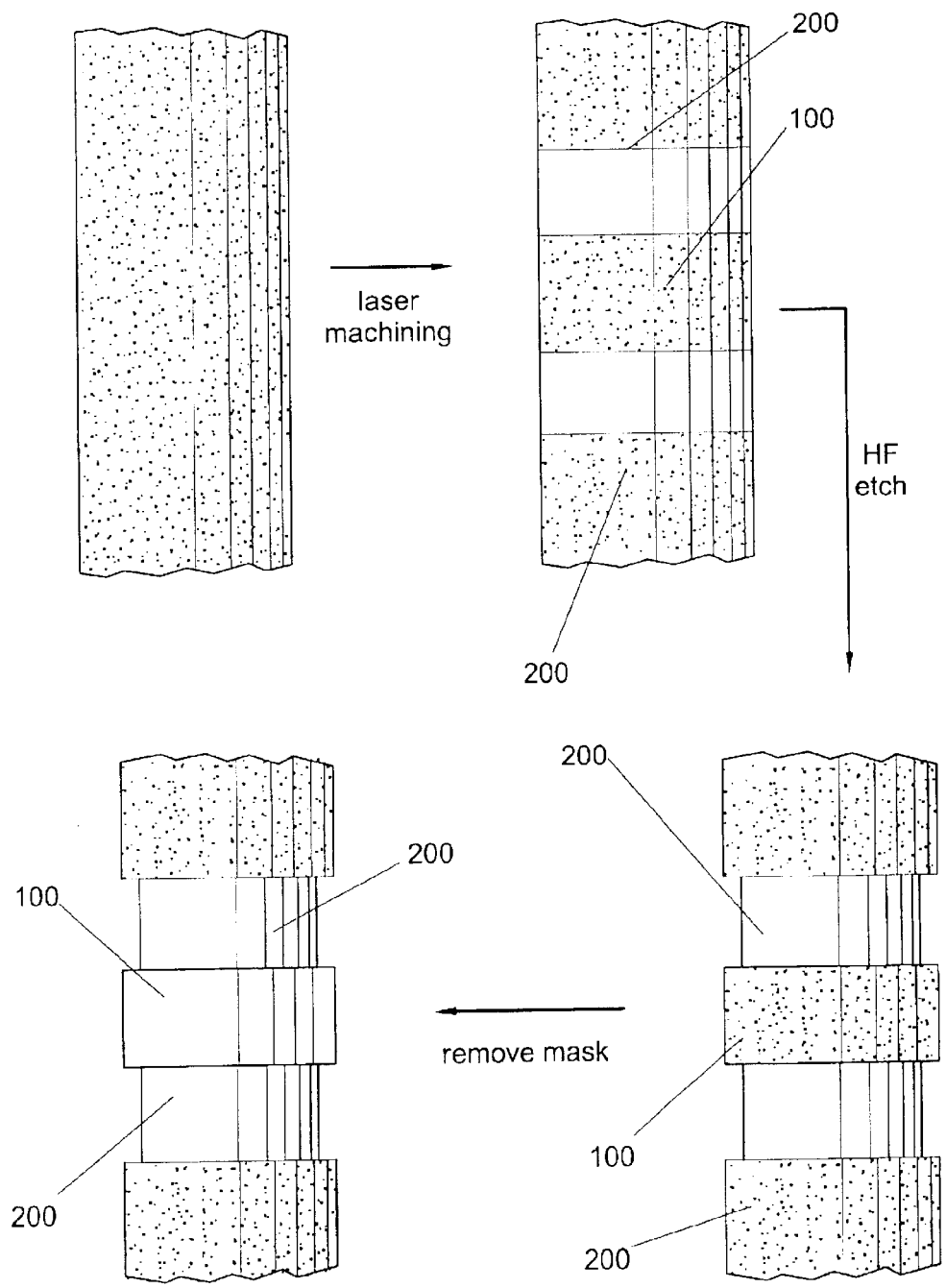
FIG. 3 illustrates a method for fabricating a circumferential-mode resonator on an optical fiber according to the present invention. All views are side views, and stippled shading indicates the presence of an outer coating on the outer surface of the optical fiber.

A preferred method for reducing the size of the adjacent portions relative to the resonator segment comprises the steps of: 1) providing the resonator segment with a mask; 2) spatially-selectively etching the adjacent portions, thereby reducing their diameters relative to the diameter of the resonator segment; and 3) removing the mask (FIG. 3). Many optical fibers are supplied with an outer coating comprising a polymer jacket (acrylate, polyimide, or the like), and this jacket may be used as a mask provided it adheres sufficiently to the optical fiber during etching. A preferred mask may comprise an outer fiber coating (shown as stippled shading in FIG. 3) comprising a carbon coating. Optical fiber having a hermetic carbon outer coating (with or without a polymer jacket over the hermetic carbon coating) may be obtained commercially (Hermeticoat optical fiber, sold by Spectran Specialty Optics) or may be fabricated by deposition of a carbon layer on the fiber cladding (see for example U.S. Pat. No. 5,281,247, said patent being hereby incorporated by reference in its entirety as if fully set forth herein). A carbon coating has been found to adhere very well to the optical fiber during etching of the optical fiber. A metal coating may also be employed, and whatever type of coating is used, it may first be deposited on the fiber.

Whether the outer coating comprises a polymer jacket or a carbon film, the outer coating must be spatially patterned appropriately, thereby yielding a mask substantially covering the desired resonator segment upon etching. The mask may preferably be patterned by spatially selective laser machining of the outer coating, removing the outer coating from the adjacent portions and leaving the outer coating on the resonator segment. A polymer jacket outer coating may be laser machined using a UV-emitting excimer laser. A carbon film outer coating may be laser machined using a pulsed laser (presumably ablatively) or with a substantially continuous laser (presumably thermally). During laser machining to pattern the mask the optical fiber may preferably be rotated about its long axis to produce ring-like mask patterns on the fiber. This rotation should preferably be concentric (thereby substantially minimizing any "orbital" motion of the fiber cross-section about the rotation axis, also referred to as centration error). This may preferably be achieved by using a rotational guide such as a vacuum V-block for defining a fiber rotation axis. Sufficient negative pressure may be applied to maintain low centration error during rotation, but must be sufficiently low to allow smooth rotation at a sufficiently high speed (typically 100–300 rpm). Paired V-blocks may be employed, one on each side of the fiber length to be machined, to enhance the positioning stability of the rotating fiber. Alternatively, a capillary tube or fiber ferrule (singly or in pairs) may be used in any equivalent manner to align the fiber for rotation and laser machining. (Hereinafter, use of a capillary for fiber alignment as described herein shall be understood to equivalently encompass use of a fiber ferrule). A capillary tube should be chosen having an inner diameter closely matching the optical fiber diameter. For example, the carbon-coated fiber mentioned hereinabove has a nominal diameter of 125 $\mu$m. Capillary tubing is commercially available (0.4 lambda supplied by Drummond Scientific, Inc.) having an inner diameter of 126.4–0.3 $\mu$m, making it ideal for concentrically aligning and rotating the fiber during laser machining. This V-block, capillary or fiber ferrule alignment technique for substantially concentric rotation of the optical fiber may be employed during any other fabrication step requiring such rotation of the optical fiber, as set forth hereinbelow. Similar use of a capillary for substantially concentric rotation of an optical fiber during laser processing is described in a publication of Presby et al. (Applied Optics 29 2692 (1990)), said publication being hereby incorporated by reference in its entirety as if fully set forth herein. While remaining within the scope of inventive concepts disclosed and/or claimed herein, any suitable means may be employed for substantially concentric rotation of the optical fiber during laser machining, including but not limited to V-blocks, a capillary tube, a fiber ferrule, an alignment chuck, an alignment jig, an indexed fiber holder, and so forth, either singly or in pairs.

Figure 4:
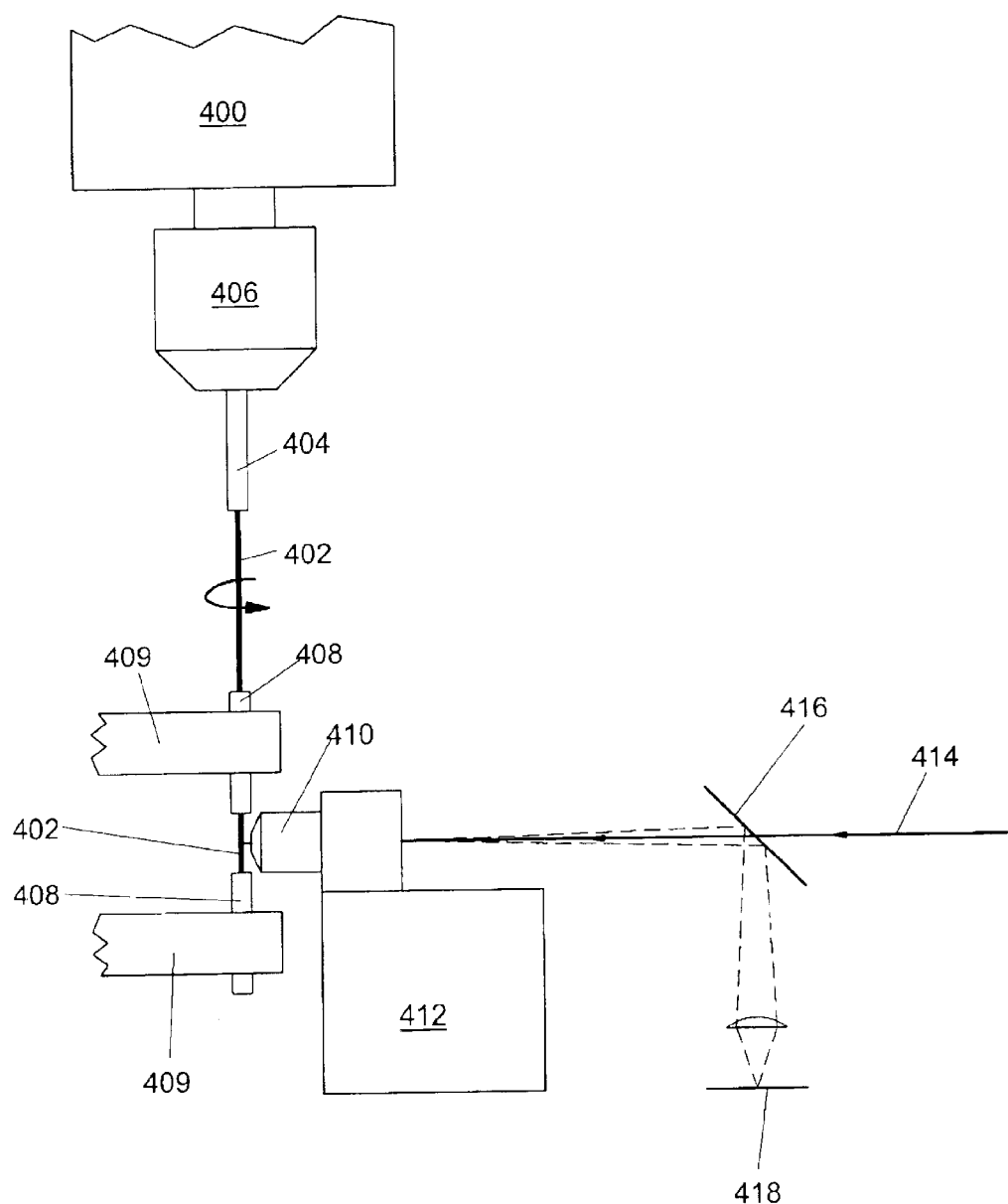
FIG. 4 shows schematically an apparatus for highly concentric rotation of an optical fiber during laser machining or other fabrication process according to the present invention.

It should be noted that the rotary bearing and rotary actuator may be used to form full rings on the optical fiber by fully rotating the fiber under substantially continuous exposure to the laser beam (or other focused processing beam; ion, electron, atomic, plasma, and so forth). However, it also be desirable to provide only partially-machined rings on the optical fiber. These partial rings may be employed to produce asymmetric structures on the fiber upon subsequent processing. Partial rings may be generated by only partially rotating the fiber as it is exposed to the laser beam. Alternatively, the laser beam may be synchronously modulated (i.e., shuttered) as the fiber fully rotates, thereby only exposing a partial ring of the fiber. Such synchronous modulation may be readily implemented using a opto-interrupt switch or functionally similar device to couple beam shuttering to fiber rotation In a preferred method for precisely machining rings in a hermetic carbon mask material, the carbon coated fiber may be threaded through a first V-block, capillary tube or other rotation guide. A relatively long segment of the carbon coated fiber (as long as several inches or more) may extend from the first end of the capillary, and is coupled to a rotation device. The rotation device must produce controlled, substantially uniform rotary motion of the fiber with minimal thrust error. (The term "thrust error" refers to any unwanted longitudinal motion that may accompany the desired rotary motion. The thrust error that is synchronous with the rotation results in a tilt of the machined ring with respect to a plane perpendicular to the fiber axis, an effect which may be used to intentionally produce tilted rings. Provided that the thrust error is kept small, less than about 10% of the ring diameter, the ring tilt will not result in substantial undesirable radiative loss from the ring segment. Control of the tilt may be exploited to tune the resonant frequency of a ring fabricated from an optical fiber of a given diameter, since the perimeter path length, and hence the optical resonance frequencies, of the ring can be varied by varying the ring tilt angle by adjusting the thrust "error"). A prototype system (FIG. 4) has been successfully constructed using a precision drill press (Cameron Micro Drill), but a preferred embodiment, also successfully prototyped, comprises an air bearing spindle 400 (Professional Instruments 4B) belt-driven by a stepper motor/encoder system (not shown). An air-bearing spindle may be preferred as having the smallest achievable thrust error currently available commercially (as small as 25 nm; thrust error of about 1 $\mu$m or less is generally sufficient for the present invention; thrust error as high as 10 $\mu$m may be tolerated under less demanding circumstances). Carbon coated fiber 402 may be secured substantially co-axially to the air bearing spindle (optionally cemented within a capillary tube 404 and the capillary tube secured to air bearing spindle 400). Without departing from inventive concepts disclosed and/or claimed herein, other devices may be equivalently employed to produce the desired rotary motion, including but not limited to rotation stages, stepper-motor-driven rotators, servo-motor-driven rotators, and the like. As the air-bearing spindle or other rotary device rotates the carbon-coated fiber, the fiber rotates within a vacuum V-block, capillary tube, or other rotation guide 408 with low centration error. As long as both fiber and the rotation guide are substantially uncontaminated, this rotation of the fiber within the capillary will not damage the carbon coating. If desired, it may be possible to drive air or other gas through a capillary around the rotating fiber to serve as an air-bearing. The alignment fiber is substantially rigidly mounted in a standard fiber chuck or other similar device 409, and a relatively short segment of the carbon-coated fiber 402 extends beyond the second end of the rotation guide 408. A second rotation guide may be employed on the far end of the fiber to further limit lateral motion during rotation. A microscope objective 410 (60X in the prototype; others may be used as appropriate) for delivering a laser beam for laser machining may be mounted on a precision 3-axis translator 412 for precise positioning relative to the carbon-coated fiber.

A laser beam 414 from an argon ion laser (typically multi-line visible output, mainly 488 nm and 514 nm, between about 10 mW and about 100 mW average power) or a continuous wave frequency-doubled YAG laser laser (visible output, at 532 nm nm, between about 10 mW and about 100 mW average power) is brought to a spot size between about 0.2 $\mu$m and about 3 $\mu$m, preferably about 0.5–1.0 $\mu$m, by the objective 410 onto the surface of the fiber 402 as it rotates, thereby removing the carbon coating from the fiber (presumably by a thermal mechanism). A beamsplitter 416 in the laser beam path allows back-scattered and/or back-reflected laser light from the fiber to be imaged at 418 in order to adjust the focus of the laser beam sufficiently precisely relative to the surface of the fiber. The laser beam need not necessarily be focused at the surface of the fiber (although it could be, if desired). Use of a microscope objective is important for several reasons. The highly convergent beam enables the machining of rings in the hermetic carbon coating as small as 0.5 to 3 $\mu$m wide with relatively sharp edges, which in turn reduces the roughness of the edges of the resonator segment produced by subsequent etching. A tight focus on the machined surface of the fiber also insures that the laser beam transmitted through the fiber will be sufficiently defocused when it reaches the opposite surface of the fiber so that none of the coating will be removed from the opposing surface, which would degrade the precision of the edges of the machined rings. The centration error of the carbon-coated fiber within the capillary tube is typically sub-micron, well within the depth-of-focus of the tightly focused laser beam (typically a few microns). It has also been observed that microscopic defects may occur in the portions of the carbon coating left behind after laser machining, resulting in unwanted etched spots and edge roughness in the resonator fiber segment and degradation of the performance of the resulting WGM resonator. This effect is believed to be due to excessive heating of the carbon-coated fiber during laser exposure, which causes damage to the carbon coating and/or the underlying silica adjacent to the carbon being exposed. In addition, exposure of the carbon-coated fiber at high power (greater than about 30 mW) causes texturing of the silica underlying the exposed carbon, presumably due to melting of the underlying silica. It has been observed that reducing the optical power of the exposing laser beam to 10–25 mW substantially eliminates the thermal damage problem as well as the surface texturing problem. It has also been observed that flowing gas ($O_2$, $N_2$, and ambient air have been used successfully, although $O_2$ may be preferable) around the fiber as it is machined seems to mitigate the defect problem.

It should be noted that a microscope objective may not be required for sufficiently precise machining of rings in the carbon coating. In general, if the optical fiber is substantially transparent to the wavelength used for machining the carbon coating (or other fiber outer coating), then the beam must be highly convergent (with an objective or similar optical assembly having an NA greater than about 0.3, preferably around one) so that the transmitted beam is too diffuse to damage the fiber outer coating on the opposite side of the fiber. However, if the fiber is not transparent to the laser-machining wavelength (157 nm from an $F_2$ excimer laser, for example, or if the fiber is a hollow fiber filled with material non-transparent at the laser-machining wavelength, or if the fiber is doped to render it non-transparent at the laser-machining wavelength), then damage to the opposite side of the fiber is no longer an issue, and the optical assemblies having longer working distances (i.e., smaller NA) may be employed. This is a general principle that may be applicable to other laser-machining steps set forth hereinbelow. Any laser source suitable for laser machining (known in the art or hereafter developed) may be employed while remaining within the scope of inventive concepts disclosed and/or claimed herein, for any laser machining step disclosed herein.

For silica or silicate-based optical fibers, aqueous hydrofluoric acid (HF) is an effective etching agent for removal of material from the adjacent segments of the optical fiber. The amount of material removed can be precisely controlled by controlling the etching time, etchant concentration and/or pH, and/or temperature. The etched surfaces are quite smooth and substantially free of irregularities, thereby minimizing optical scatter from the etched surfaces of the circumferential-mode optical resonator. It should be noted that as the etching process proceeds radially, exposure of transverse edges of the resonator segment become exposed to the etchant and come under attack. The thickness of the resulting resonator segment is therefore somewhat smaller than the width of the initial ring-shaped mask, and the edge of the resonator segment may be slightly concave. The concentration of HF used to etch the optical fiber may be between about 5% and about 50% HF buffered with $NH_4F$, should preferably be between about 7% and about 8% HF and between about 30% and about 40% $NH_4F$, and most preferably about 7.2% HF and 36% $NH_4F$. The most preferred concentration yields an etch rate of about 80 nm/min, and is available commercially (Transene Company, Inc.). Another suitable HF concentration is 1 part 40% HF(aq) combined with 10 parts 40% $NH_4F$(aq), as disclosed in the publication of Eisenstein et al. (Applied Optics 21 3470 (1981), said publication being incorporated by reference in its entirety as if fully set forth herein. Any of these disclosed concentrations may be employed during any other fabrication step requiring an HF etch, as set forth hereinbelow. While remaining within the scope of inventive concepts disclosed and/or claimed herein, any suitable wet or chemical etching agent (either known in the art or hereafter developed) may be used to reduce the diameter of the adjacent portions or other portions of the fiber. Alternatively, dry or reactive ion etching procedures, employing suitable etch masks (metal masks or polymer masks, for example), may be used to reduce the diameter of the adjacent portions or other portions of the fiber. After etching, the mask may be removed by any of a variety of methods, including but not limited to non-spatially-selective laser machining, chemical/ solvent removal, thermal removal (i.e., burning), exposure to an electrical discharge, plasma ashing, ion sputtering, and other suitable methods for removing the mask (known in the art or hereafter developed).

Figure 10:
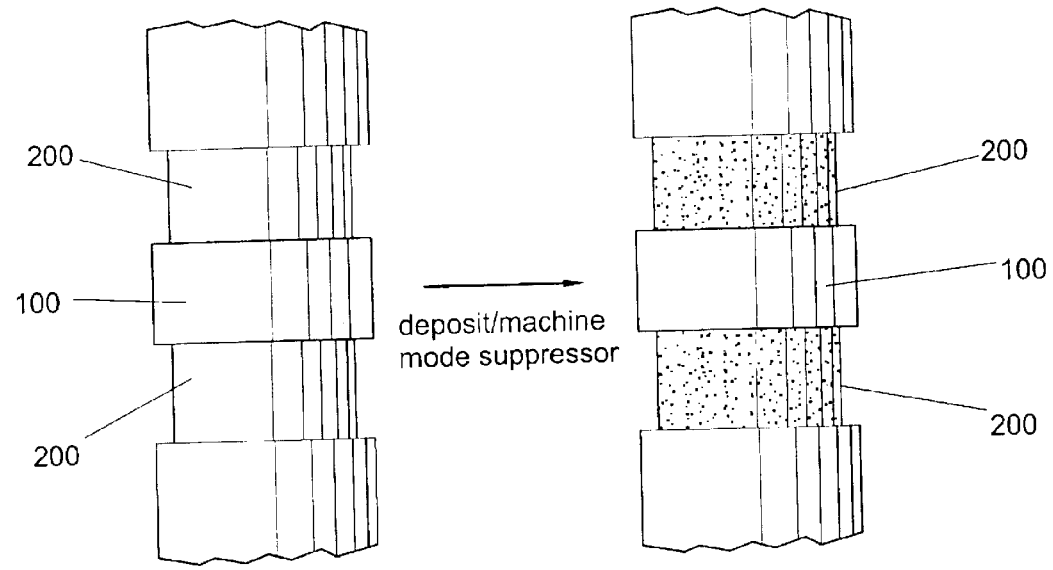
FIG. 10 shows a fiber-ring resonator with optical mode suppressors.

It may be preferable, however, to leave a portion of the mask on the resonator fiber. After etching, the same cylindrical laser machining techniques used to produce the mask may be employed to spatially-selectively remove the mask material from the resonator segment 100, while leaving the mask on un-etched portions of surrounding fiber segments 200 (FIG. 3). The etched grooves between the resonator segment and the surrounding segments are preferably between about 5 $\mu$m and about 10 $\mu$m wide, for a resonator segment between about 2 $\mu$m and about 4 $\mu$m wide. By leaving the mask material (generally optically absorbing and/or scattering) on the surrounding fiber segments, delocalized modes supported by the resonator fiber may be selectively suppressed, while leaving the desired circumferential optical mode substantially undisturbed. The result is a clean resonance spectrum for the circumferential resonator, and little or no cross-talk and/or undesirable optical loss in resonant optical control devices employing fiber-ring resonators according to the present invention. Such mode suppression may also be desirable for a coupled set of multiple fiber-ring resonators on a singe resonator fiber. Alternatively, delocalized-optical-mode suppressors may be provided on surrounding segments of the resonator fiber as a separate fabricating step, regardless of the method used to fabricate the fiber-ring resonator. An optical absorber may be deposited or an optical scatterer may be deposited, machined, etched or otherwise fabricated using methods described herein, on portions of the surrounding segments of the resonator fiber (FIG. 10). Delocalized-optical-mode suppressors may also be employed near other structures fabricated on an optical fiber, such as alignment members and fiber-taper positioners as described hereinbelow. Such structure may support unwanted and potentially interfering delocalized optical modes. These modes may be suppressed by providing absorbing or scattering members on the fiber near the structure. Such mechanical structures may also be fabricated to extend only partially around the fiber, also mitigating the problem of delocalized-optical modes.

An alternative method for dealing with delocalized optical modes is the use of optical fiber having an absorbing and/or scattering core. Such a core serves to suppress any delocalized optical modes while leaving desired circumferential optical modes substantially undisturbed. Such a fiber may be manufactured with an absorbing and/or scattering core, or hollow-core optical fiber may be employed, and the hollow core filled with absorbing and/or scattering material of any suitable type.

Figure 5:
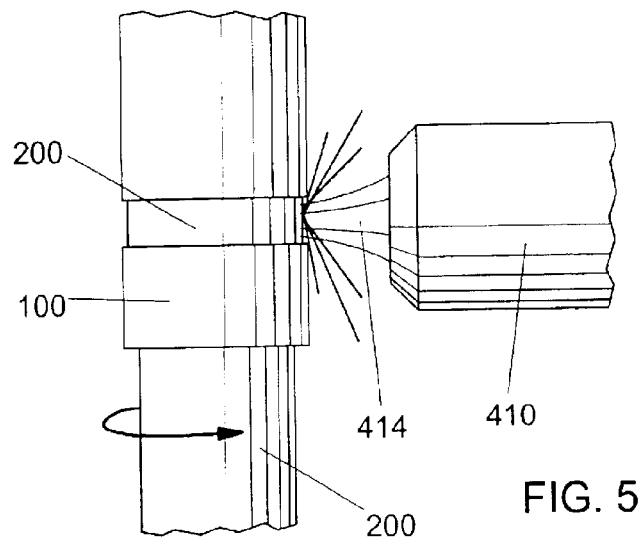
FIG. 5 shows an optical fiber being laser-machined according to the present invention.
Figure 6:
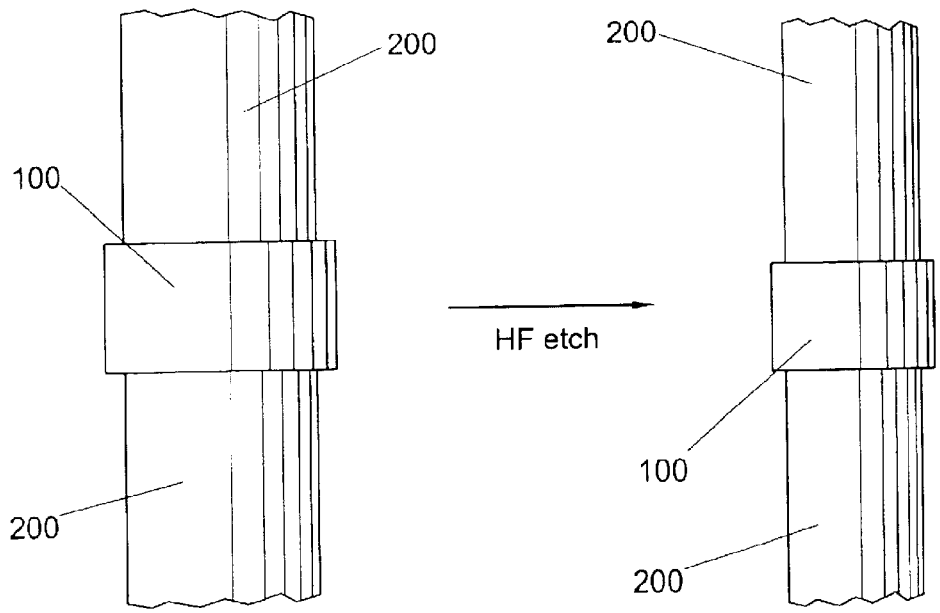
FIG. 6 shows reduction of the diameter of a circumferential-mode resonator on an optical fiber according to the present invention.

As an alternative to the mask-and-etch procedure described hereinabove, the diameters of the adjacent portions may be reduced by direct laser machining of the fiber to remove optical fiber material (FIG. 5). Substantially concentric rotation may preferably be employed during laser machining using one or more vacuum V-blocks as described hereinabove. Laser machining may be performed without removing a fiber jacket (if present), in which case the fiber jacket is removed from the adjacent portions during laser machining and the portion of the jacket remaining on the resonator segments may be removed after laser machining by any appropriate method. Alternatively, the fiber jacket (if present) maybe removed from the resonator segment and the adjacent portions prior to laser machining. A fluorine excimer laser emitting at 157 nm may preferably be used for laser machining a silica or silicate-based optical fiber, although other appropriate laser sources (pulsed UV-emitting laser sources, amplified and/or modelocked titanium:sapphire lasers, pulsed $CO_2$ lasers, and so forth) may be employed (particularly for other types of optical fiber) while remaining within the scope of inventive concepts disclosed and/or claimed herein. The earlier discussion of a low NA laser-beam-delivery optical assembly (if the fiber is substantially opaque at the laser-machining wavelength) versus a high NA laser-beam-delivery optical assembly (if the fiber is substantially transparent at the laser-machining wavelength) applies to direct machining of the optical fiber (a high NA assembly, i.e., a microscope objective, is shown in FIG. 5 and is exemplary only). Following laser machining the fiber, including the resonator segment and the adjacent portions, may be polished to reduce and/or eliminate laser-machining-induced irregularities on the circumferential-mode resonator. Such irregularities may act as light scattering centers, thereby degrading the performance (Q-factor, for example) of the circumferential-mode resonator. Suitable polishing techniques may include but are not limited to spatially non-selectively etching, thermal polishing with a flame or $CO_2$ laser, polishing with an electrical arc or fusion splicer, and so forth. Once the adjacent portions have been reduced in diameter relative to the resonator segment, the diameter of the resonator segment may be reduced to achieve a desired circumferential-mode resonant frequency and/or a desired free spectral range between modes, while producing a diameter of the resonator segment 100 the desired amount larger than the diameter of the adjacent portions 200. The desired free spectral range will be determined by the wavelength spacing of channels in the particular WDM standard in use and the number of these channels desired to be modulated by an optical power control device employing circumferential-mode resonator according to the present invention. The circumferential-mode free spectral range divided by the channel spacing yields the approximate number of channels that may be simultaneously modulated by a single device or a series of devices on a single transmission optical fiber. Resonator segment diameters below about 10 $\mu$m may result in a circumferential-mode resonator Q-factor that is unacceptably low. The thickness of the resonator segment should preferably be between about 1 µm and about 10 µm, and most preferably between about 2 µm and about 4 µm. The diameter of the resonator segment may be reduced by spatially non-selective etching, employing aqueous HF (as described hereinabove) or other suitable etching agent (FIG. 6). This may also reduce the thickness of the resonator segment by etching the edges of the resonator segment, and the resulting edges may be slightly concave (as described earlier). Alternatively, the diameter of the resonator segment may be reduced by laser machining as described hereinabove and shown in FIG. 5 (and may preferably include use of a V-block, capillary tube, or fiber ferrule for substantially concentric rotation of the optical fiber during laser machining, as described hereinabove). Relatively fine-tuned selection of the circumferential-mode resonator diameter and/or thickness may be required to select a particular wavelength component from among the wavelength components present in a wavelength-division-multiplexed (WDM) optical signal. This process may be referred to a resonator trimming. For example, to fabricate a circumferential-mode resonator selectively resonant with a single channel (typically about 10 GHz wide, for example) from among the 50 GHz- or 100 GHz-spaced WDM channels present within the ca. 80 nm overall bandwidth of the erbium amplifier C and L bands (centered around 1550 nm), the diameter must controlled to within about ±5 nm (±10 GHz for the resonator frequency), requiring control of the etch time on the order of about 1 second to about ±10 seconds. Such precision of fabrication may be readily achieved using standard techniques of laser machining or other precision machining methods, or by careful control of etch conditions (etchant concentration and/or pH, temperature, and/or etching time). Appropriate dilution of the etchant may yield slower etch rates, thereby enabling enhanced precision for the final diameter of an etched resonator segment.

An alternative process may be employed to trim a fiber-ring resonator to a desired resonance frequency. It is well-know that germano-silicate optical fiber (including hydrogen loaded and boron-co-doped germano-silicate optical fiber) is photosensitive. This phenomena has been used to write Bragg gratings into an optical fiber, for example. Irradiation leads to an increase in the refractive index of the material. By exposing a fiber-ring resonator, fabricated with a photosensitive germano-silicate resonator fiber, to visible or UV irradiation, the resonance frequencies may be precisely adjusted. The irradiation may be done using a focused visible or UV source (such as an excimer laser, ion laser, or doubled, tripled, or quadrupled solid-state laser, or other visible or UV source), or may be done using surface or shadow mask techniques and an unfocused visible or UV source. It is desirable to monitor the resonance spectrum of the fiber-ring during trimming, and this may be done by monitoring the transmission spectrum of a fiber taper or other evanescent waveguide coupled to the fiber-ring resonator during trimming. A particularly elegant solution involves delivering the visible or UV illumination through the same fiber taper used to monitor the resonance frequency. The length of fiber that may be used in this way is limited, due to the relatively high loss of most optical fiber in the UV. This visible or UV trimming technique may be used on single fiber-ring resonators, or may be applied to a coupled system of fiber-ring resonators, either individually or as a group. To individually monitor one resonator from a coupled system, it is necessary to suppress the resonant modes of the other resonators in the system, for example, by contacting all other resonators except the one monitored with a loss probe. It has been observed that for long term stability of the trimming, thermal annealing of the fiber-ring is necessary. The refractive index (and therefore the resonance frequency) of the fiber-ring may shift slightly during the annealing process. Some experimentation is typically required to establish an exposure calibration that accounts for the frequency shift during annealing.

Alternatively, a desired circumferential-mode resonant frequency may be obtained by fabrication of a suitably tilted resonator segment as set forth hereinabove. The resonant frequency shift varies as $\sin^2 \theta$, where $\theta$ is the angle between the tilted ring and a plane perpendicular to the longitudinal axis of the optical fiber. Controlled longitudinal motion of the fiber during rotation as the fiber is machined may be employed to impart the desired tilt angle on the resonator. It should be noted that controlled longitudinal motion of the fiber or laser focusing objective may be employed to produce sinusoidal rings, or rings having any desired curvilinear shape. This may be accomplished by including a longitudinal actuator in the fiber rotation assembly, or alternatively by utilizing the longitudinal positioner 412 of the objective lens 410.

It should be noted, however, that stable operation of a resonant optical power control device according to the present invention may require temperature stabilization of the circumferential-mode resonator. It has been observed that the resonance frequencies of a circumferential-mode resonator based on silica microsphere varies with temperature by about 2.5 GHz/° C., and presumably a similar quantity (modified by the appropriate geometric factor) applies to disk or ring circumferential-mode resonators fabricated from silica optical fiber according to the present invention, thereby necessitating control of the circumferential-mode temperature. However, this also affords the opportunity to control the resonant wavelength of the circumferential-mode resonator by varying the temperature at which the circumferential-mode resonator is maintained/stabilized. This may be accomplished with no substantial additional cost or complexity, since temperature stabilization is required even if temperature tuning of the resonant frequencies is not desired. Any suitable method for monitoring and controlling the circumferential-mode temperature (known in the art or hereafter developed) may be employed while remaining within the scope of inventive concepts disclosed and/or claimed herein. A thermo-electric cooler may be well-suited for controlling the resonator temperature, although other temperature control devices may serve as well.

Figure 7:
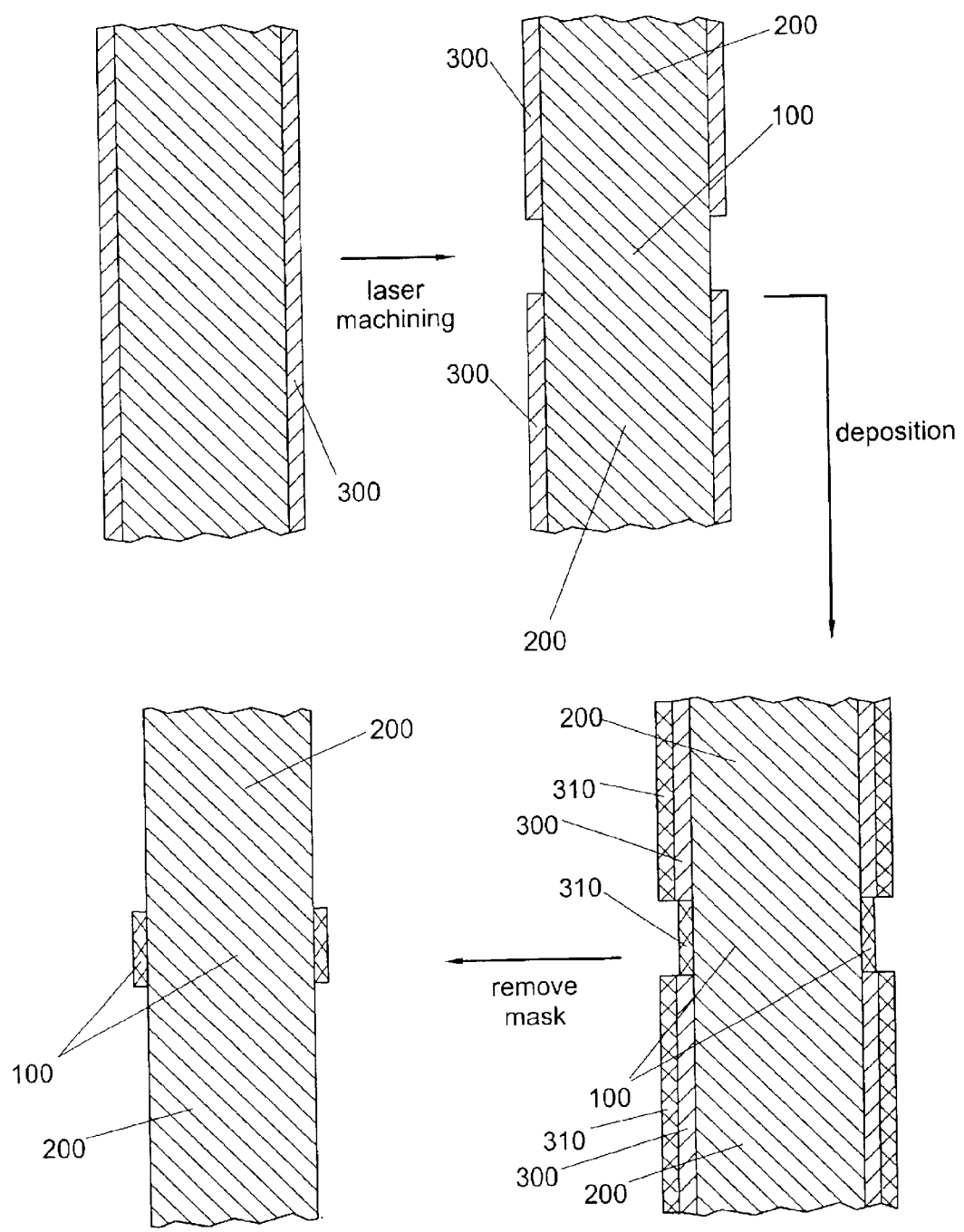
FIG. 7 illustrates a method for fabricating a circumferential-mode resonator on an optical fiber according to the present invention. All views are side cross-sectional views.

Instead of decreasing the diameter of the adjacent portions, the resonator segment may alternatively be enlarged by deposition of a substantially annular ring of material on the optical fiber. This may preferably be accomplished by the process of: 1) providing the adjacent portions with a mask while leaving the resonator segment substantially exposed; 2) spatially-selectively depositing material on the resonator segment, thereby increasing its diameter; and 3) removing the mask from the adjacent portions (FIG. 7). In particular, it may be preferred to provide the mask by spatially-selective removal of an outer coating 300 of the optical fiber from the resonator segment. This spatially-selective removal of the outer coating of the optical fiber may be performed by laser machining as already described herein and shown in FIG. 5. The outer coating of the fiber may comprise the polymeric jacket of the fiber, or may comprise any suitable mask material deposited on the fiber prior to the mask-providing step. A UV-emitting excimer laser may preferably be employed for laser machining of the polymeric jacket, although any other suitable laser source may be employed for laser machining a particular mask material. The fiber may be rotated during laser machining and may be mounted in a rotation guide to provide substantially concentric rotation, as already described elsewhere herein.

As shown in FIG. 7, once the mask has been provided substantially covering the adjacent portions while leaving the resonator segment 100 substantially exposed, material 310 may be spatially-selectively deposited on the resonator segment by any of a variety of suitable techniques. Chemical vapor deposition (CVD) may be a preferred deposition technique, although other techniques may be employed (often depending on the nature of the material being deposited) while remaining within the scope of inventive concepts disclosed and/or claimed herein. Such techniques may include but are not limited to: deposition of self-assembled monolayers (SAM's), thermal evaporation/deposition, sputter deposition, epitaxial techniques, beam assisted deposition techniques (laser, ion, electron, x-ray, radical, molecular, atomic, or other activation beams may be employed) combinations thereof, and/or functional equivalents thereof. The fiber may preferably be rotated during deposition of the material, thereby resulting in substantially uniform deposition of material around the circumference of the optical fiber. The fiber may be mounted within V-blocks, capillary tubes, or fiber ferrules singly or in pairs, thereby enabling substantially concentric rotation of the fiber for substantially uniform deposition. After deposition of the material 310, the mask (i.e., outer coating 300) may be removed by any suitable mechanical, chemical, optical, or other process suitable for the particular mask employed. The deposited material 310 forms a substantially annular ring on the circumference of the optical fiber, and eventually forms at least a portion of the circumferential-mode optical resonator segment 100. Shadow-masked deposition, focused material beam deposition, or focused-beam-assisted deposition may be employed as an alternative to surface-masked deposition.

A dielectric material may typically be preferred as the deposited material. Suitable materials may include, but are not limited to: silicate, rare-earth-doped glasses, semiconductor-doped glasses, amorphous semiconductors, chalcogenide glasses, amorphous silicon alloys, combinations thereof, and/or functional equivalents thereof. It may be preferred to use a material having substantially fixed optical properties (silica, for example), thereby yielding a circumferential-mode resonator having substantially fixed properties. Alternatively, it may be desirable to deposit material that enables subsequent modification and/or modulation of the circumferential-mode resonator properties. Such a material may comprise a pure material, a mixture of materials, a secondary material deposited as a thin film coating on a primary material, and/or a primary material having one or more secondary materials as dopants therein. Materials may be selected, designed, and/or formulated to enable controlled modulation of optical properties of the circumferential-mode resonator, including but not limited to: optical loss, optical gain, optical coupling to/from the circumferential-mode resonator, resonant frequencies, free spectral range, and so forth. The materials used may include, but are not limited to: dielectric materials, electro-optic materials, electro-absorptive materials, non-linear optical materials, semiconductor materials, metals, polymers, combinations thereof, and/or functional equivalents thereof Application of electronic, optical, and/or other control signals to the circumferential-mode resonator may be employed for modulation of one of more of the circumferential-mode optical properties.

Following deposition of material on the resonator segment to form the circumferential-mode resonator, the diameter of the circumferential-mode resonator may be reduced by removal of material to alter resonant frequencies and/or the free spectral range of the circumferential-mode resonator using etching, laser machining, and/or other suitable techniques as already described herein (FIGS. 5 and 6). Visible or UV trimming may also be employed for suitable ring materials. Preferred ranges for resonator segment diameter, thickness, and free spectral range have been given hereinabove.

The refractive index of the fiber may be the property that differs between the resonator segment and the adjacent portions of the surrounding segments of the resonator fiber. A transverse resonator segment having a refractive index as little as $10^{-5}$ greater than the refractive index of the adjacent portions may enable confinement of a circumferential-mode optical wave propagating around the circumference of the resonator segment at least partially within the fiber segment. The refractive index of the resonator segments may be increased by spatially-selectively exposing a photosensitive resonator fiber to visible or UV irradiation (increasing the optical pathlength of the resonator segment), or the chemical composition of the resonator segment may be spatially-selectively altered to yield a larger refractive index. Generation of this refractive index differential may be accomplished while producing fewer irregularities (such as arise during laser machining) on the optical fiber that could lead to scattering during use of the device and degradation of the performance characteristics of the circumferential-mode resonator (such as the resonator Q-factor).

Figure 8A:
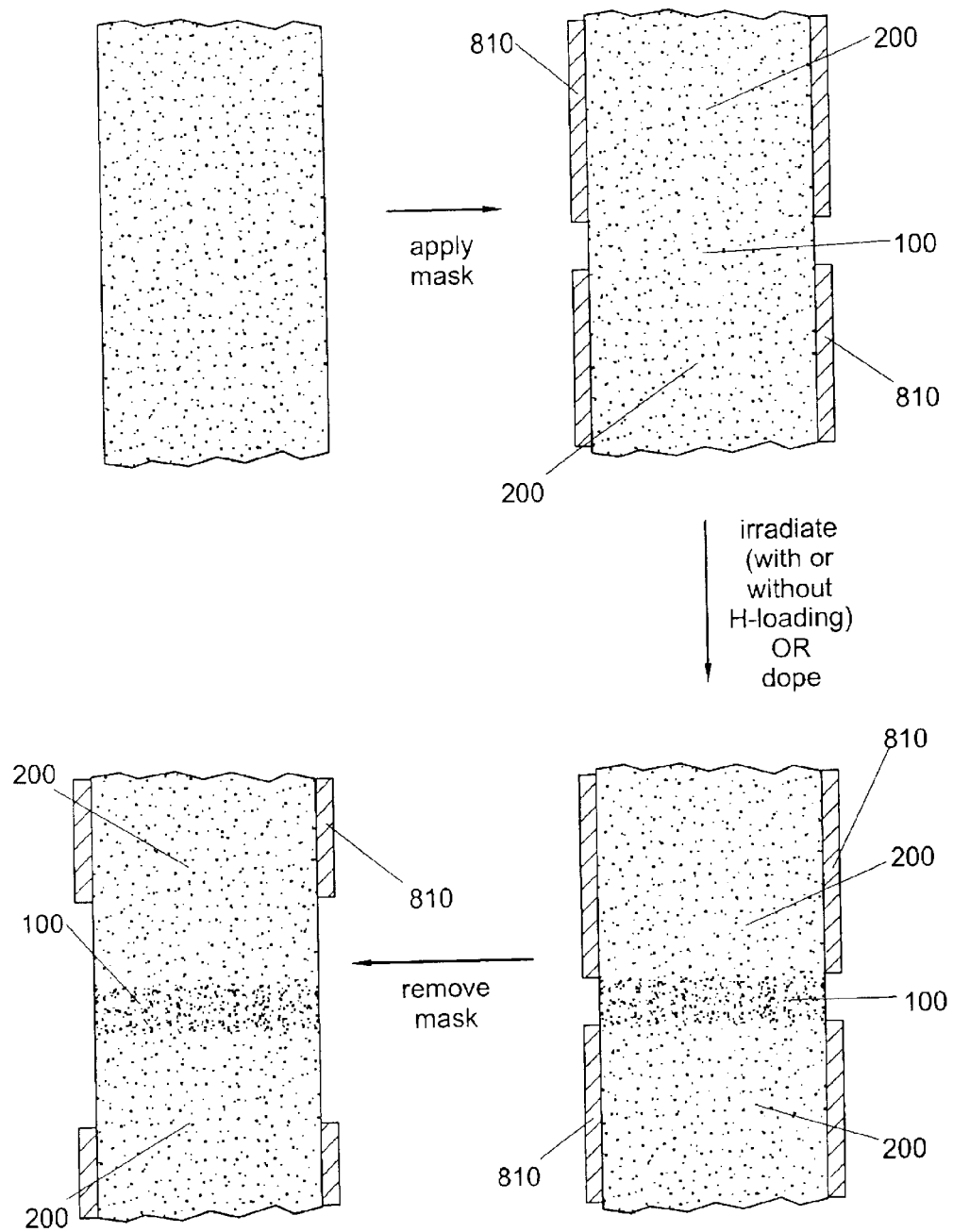
FIG. 8A illustrates a method for fabricating a circumferential-mode resonator on an optical fiber according to the present invention. All views are side cross-sectional views, and the density of the stippled shading indicates the relative refractive index, density, and/or dopant concentration.
Figure 8B:
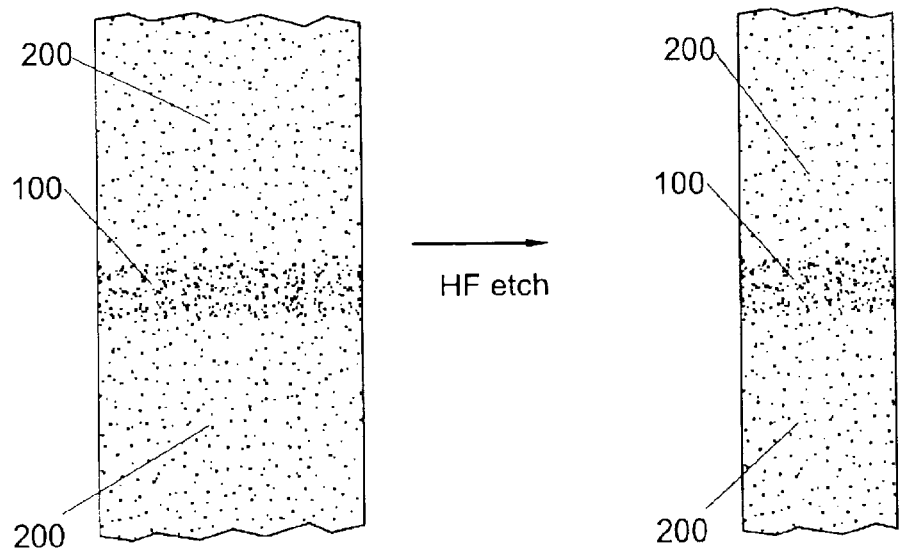
FIGS. 8B and 8C show reduction of the diameter of a circumferential-mode resonator on an optical fiber according to the present invention.
Figure 8C:
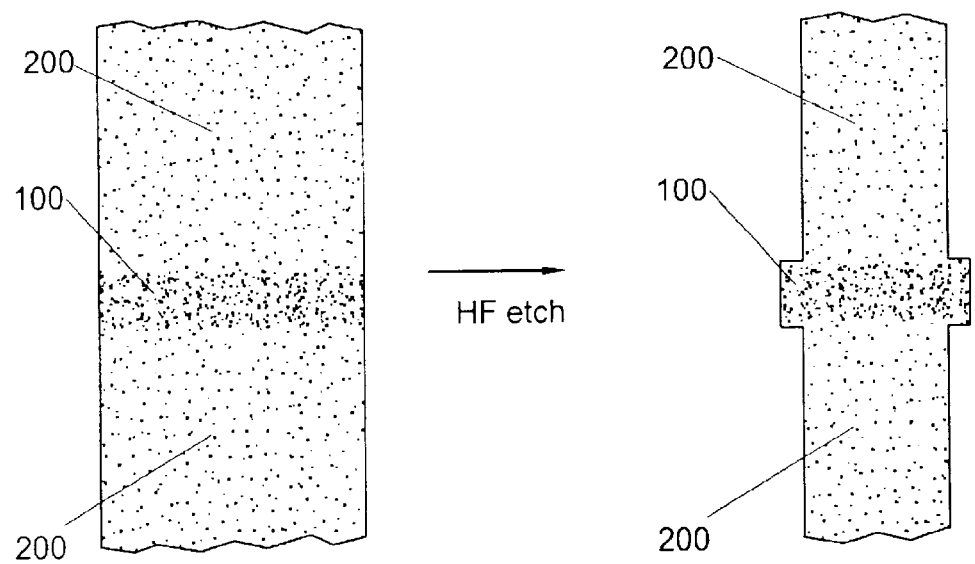

In a method for fabricating a circumferential-mode resonator according to the present invention, the optical fiber is a germano-silicate fiber or other visible- or UV-sensitive optical fiber (including hydrogen-loaded germano-silicate or boron-co-doped germano-silicate), and the resonator segment 100 is spatially-selectively irradiated with visible or UV light, thereby increasing the refractive index of the resonator segment 100 relative to the adjacent portions 200 (shown in cross-section in FIG. 8A, where the density of the stippled hatching reflects the relative refractive index, density, and/or a dopant concentration). A UV-emitting excimer laser may be particularly well-suited for this purpose, however, any suitable visible or UV source sufficiently intense and/or focusable may be employed while remaining within the scope of inventive concepts disclosed and/or claimed herein, including but not limited to an ArF excimer laser (193 nm), a KrF excimer laser (248 nm) and an argon ion laser (334 nm). Various masks 810 may be employed to obtain the desired spatial variation of refractive index, including phase masks and amplitude masks. Such techniques are disclosed in: Starodubov et al., Optics Letters, 22 1086 (1997); Hill et al., Applied Physics Letters, 62 1035 (1993); and Hill et al., Optics Letters, 19 1314 (1994). Each of these publications is hereby incorporated by reference in its entirety as if fully set forth herein. Alternatively, the spatially selective irradiation may be accomplished without masking, but by controlling the spatial profile of the irradiating beam (see discussion above pertaining to high NA and low NA optical assemblies). The fiber may be rotated during irradiating, and a V-block, capillary, or fiber ferrule (singly or in pairs) may be employed to mount the fiber and provide substantially concentric rotation as described earlier herein. The photo-induced refractive index change need not necessarily extend all the way through the fiber (as shown in FIGS. 8A, 8B, and 8C), but may comprise a ring of higher-index fiber material around the circumference of the resonator segment. The susceptibility of germano-silicate to densification by Visible or UV irradiation may be enhanced by hydrogen loading the germano-silicate material prior to visible or UV irradiation, or by boron co-doping. Hydrogen loading may be accomplished by exposing the germano-silicate optical fiber to about 2500 psi of $H_2$ gas for a period of about one week, for example. Other $H_2$ pressures and exposure times may also be suitable. Germano-silicate fiber of a sufficiently large diameter (greater than about 50 μm, for example) for fabricating circumferential-mode resonator according to the present invention may be obtained commercially, or may be produced by stripping the lower index cladding material from a multi-mode germano-silicate-core optical fiber. Such multi-mode fibers may have core diameters of about 50 μm or more, so that stripping the cladding may leave a fiber having a diameter sufficiently large to produce the circumferential-mode resonator therefrom. The cladding may be stripped by any suitable means, including but not limited to laser machining (possibly utilizing a capillary for mounting and substantially concentrically rotating the optical fiber during laser machining) and etching (with aqueous HF or other suitable etching agent).

The refractive index of the resonator segment relative to the adjacent portions may alternatively be spatially-selectively increased by altering the chemical composition of the resonator segment by a method comprising the steps of: 1) providing a mask that substantially covers the adjacent portions while leaving the resonator segment substantially exposed; 2) doping the resonator segment with a suitable doping material; and 3) removing the mask from the adjacent portions (FIG. 8A). The same methods described hereinabove for producing masks for spatially-selective deposition of material onto the fiber may also be employed for producing a mask for spatially-selective doping of the optical fiber, including use of an outer coating of the optical fiber as the mask material 810. Alternatively, the outer coating may instead be spatially-selectively removed from the adjacent portions 200 and left on the resonator segment 100, and the mask material 810 may then be deposited onto the adjacent portions 200. The resonator segment 100 may then be spatially-selectively doped after removal of the remaining outer coating therefrom. The mask material 810 may be a metal, a dielectric material, a polymer mask, or other suitable material. At the final mask removal step, portions of the mask may be left on the surrounding segments of the resonator fiber to serve a delocalized-optical-mode suppressors, as described hereinabove.

After providing the mask on the adjacent portions, the resonator segment may be doped in any of a variety of suitable techniques, including but not limited to: ion implantation of the doping material into the fiber; and simple diffusion of the doping material (by exposure of the masked fiber to dopant vapor or liquid; or by deposition of solid dopant onto the masked fiber) into the optical fiber. As in various deposition and laser machining steps described hereinabove, the optical fiber may be rotated during the doping step to obtain substantially uniform doping of the optical fiber around its circumference, and the fiber may be mounted in a V-block or capillary tube to provide substantially concentric rotation of the fiber during doping. The doped region need not necessarily extend all the way through the fiber (as shown in FIGS. 8A, 8B, and 8C), but may comprise a ring of doped fiber material around the circumference of the resonator segment. The fiber may be doped with any of a variety of suitable materials for increasing the refractive index of the optical fiber while remaining within inventive concepts disclosed and/or claimed herein. Preferred materials for use as the doping material include but are not limited to germanium, titanium, boron, aluminum, phosphorus, erbium, ytterbium, praseodymium, thulium, holmium, neodymium, europium, cerium, and other rare earth elements. In addition to altering the refractive index of at least a portion of the resonator segment, an appropriately chosen doping material may comprise a material that enables modification of the optical properties of the circumferential-mode resonator, such properties including optical loss, optical gain, optical coupling to/from the resonator, and resonant frequencies. Such doping materials may include but are not limited to materials for rendering the resonator segment: electro-optic, electro-absorptive, optically non-linear, combinations thereof, and/or functional equivalents thereof. Such doping materials may enable modulation of optical properties of the circumferential-mode resonator by application of optical, electronic, and/or other control signals to the circumferential-mode doped with the doping material. The resonator segment may alternatively be spatially-selectively doped using shadow-masked doping, focused-material-beam doping, or focused beam-assisted doping as an alternative to surface-masked doping.

In addition to producing a circumferential-mode resonator segment by spatially-selectively increasing the refractive index, spatially-selective doping may be employed to produce a circumferential-mode resonator by an alternative technique (FIG. 8C). Certain dopants (germanium, for example) are known to decrease the etch rate of silica. By spatially-selectively doping a resonator segment 100 of a silica fiber with germanium prior to etching, a relatively larger-diameter resonator segment 100 is produced by the etching process, since the adjacent portions 200 are etched at a faster rate. Careful control of the germanium doping level and the etching conditions (concentration, pH, temperature, etching time, and so forth) allow control over the properties of the resulting circumferential-mode resonator segment.

Laser machining has been set forth as a preferred method for spatially-selective removal of material from the optical fiber at various points in the cylindrical processing of the circumferential-mode optical resonator (for patterning etch masks, deposition masks, diffusion and/or doping masks, and so forth). While remaining within the scope of inventive concepts disclosed and/or claimed herein, other methods for patterned removal of material from the optical fiber may be employed, including but not limited to: lithographic methods, optical patterning of photosensitive materials and/or photo-resists, beam patterning of other resists (ion, electron, atomic, molecular, x-ray, or other beams), beam-assisted processes, surface-masked processes, shadow-masked processes, mechanical techniques, electric or plasma discharge techniques, combinations thereof, and/or functional equivalents thereof.

Figure 9A:
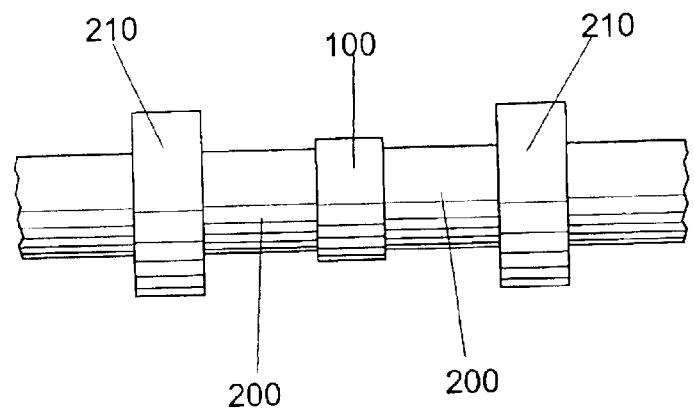
FIGS. 9A, 9B, 9C, and 9D show a WGM resonator on an optical fiber with alignment and/or indexing structures provided thereon according to the present invention.
Figure 9B:
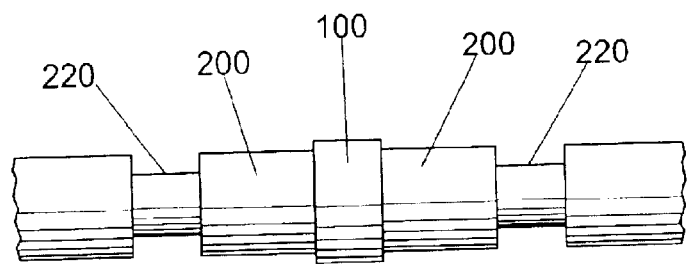

As noted above, in a typical application of a resonant optical power control device according to the present invention, the circumferential-mode resonator is optically coupled to a transmission optical waveguide, typically a second optical fiber ("transmission fiber-optic waveguide") in order to enable control of transmission of optical power through the second optical fiber. In a preferred embodiment of a resonant optical power control device according to the present invention, the circumferential-mode resonator and a second optical fiber are positioned on an alignment device to enable reproducibly established and stable maintained evanescent optical coupling between the second optical fiber and the circumferential-mode resonator. Reproducible optical coupling between the second optical fiber and the resonator is highly desirable to enable efficient and consistent fabrication of the resonant optical power control device. Accordingly, the circumferential-mode optical resonator may preferably be provided with an alignment member (alternatively referred to as an "indexing member") on at least one of the surrounding segments 200 for enabling reproducible optical coupling of the resonator segment 100 and the second optical fiber when they are positioned on the alignment device. Preferred alignment or indexing members that may be provided on one or more of the surrounding segments 200 may comprise circumferential grooves 220 and/or circumferential annular flanges 210 for engaging corresponding alignment or indexing members that may be provided on the alignment device (FIGS. 9A and 9B). Other suitable alignment or indexing members may be employed while remaining within the scope of inventive concepts disclosed and/or claimed herein. Flanges 210 and/or grooves 220 may be fabricated by spatially-selective deposition and/or removal of material from the optical fiber. A groove may be produced by removing material from the groove location, or alternatively by depositing material on each side of the groove location. A flange may be produced by depositing material on the flange location, or alternatively by removing material from each side of the flange location. Spatially-selective deposition and/or removal of material to produce flanges, grooves, and/or other alignment structures may be performed by laser machining, masking, etching, and/or other suitable cylindrical processing methods as already set forth hereinabove. Deposited material may comprise the same material as the adjacent portion, and/or any other material suitable for depositing on the adjacent portion and having properties suitable for use as an alignment structure (for example, mechanical strength, adhesion to the adjacent portion, chemical compatibility, and so forth). Examples may include but are not limited to: outer coating material of the fiber, fiber jacket material (polymeric jacket material, for example), fiber cladding material, fiber core material, and/or other functionally equivalent materials. Material removed from the fiber may comprise portions of: an outer coating material of the fiber, fiber jacket material (polymeric jacket material, for example), fiber cladding material, and/or fiber core material.

The alignment members on the resonator fiber may be capable of supporting undesirable optical modes that could interfere with the resonant modes of the fiber-ring resonator. It may therefore be desirable to provide the resonator fiber with delocalized-optical-mode suppressors in a manner similar to that described above. One or more absorbing and/or scattering coating segments may be deposited on (or left on) the resonator fiber for suppressing undesirable delocalized optical modes. Alternatively, one or more scattering portions may be provided on the resonator fiber surface for scattering undesirable optical modes. Such scattering portions may be provided by any of the cylindrical processing methods disclosed and/or claimed herein, and may comprise one or more radially recessed segments and/or radially protruding members. Such coating portions, scattering members, and the like may be provided on any optical fiber on which an optical or structural member has been fabricated and which may support undesirable optical modes that may potentially interfere with the proper operation of the resonant optical power control device.

Figure 9C:
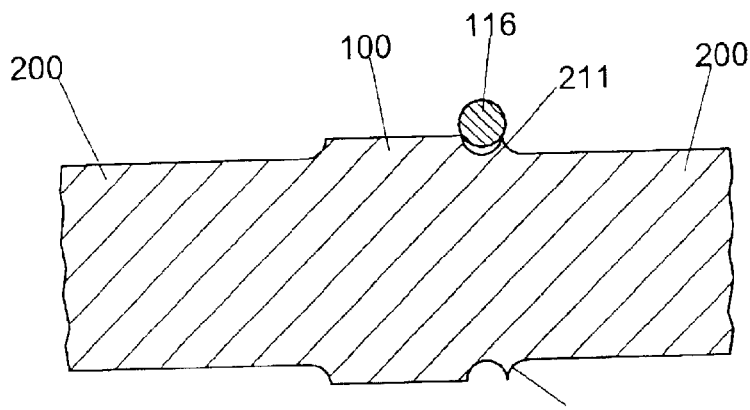
Figure 9D:
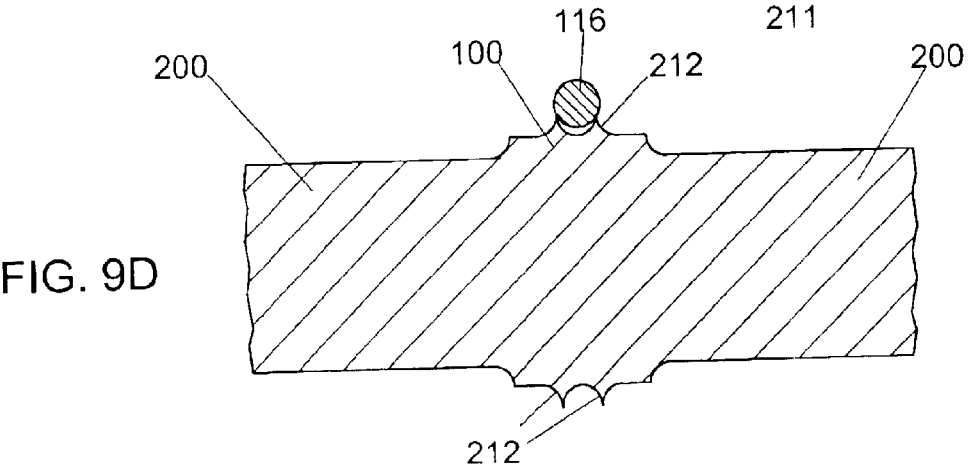

FIGS. 9C and 9D show additional alignment members provided on or near a fiber-ring resonator segment 100. In a resonant optical power control device according to the present invention, a transmission fiber-optic waveguide is typically provided with a fiber-optic-taper segment 116 to serve as an evanescent coupling segment. To reproducibly establish and stably maintain evanescent optical coupling between the fiber-optic-taper segment and the fiber-ring resonator, a taper-positioner may be provided on the resonator fiber. In FIG. 9C, a radially-extending radially-tapered transverse flange 211 is provided on the resonator fiber adjacent to the fiber segment 100. This taper positioner may be fabricated using any of the cylindrical processing methods disclosed herein. A preferred method comprises a modification of the process illustrated in FIG. 3 for surface-masked etching of the resonator fiber. In addition to the two unmasked rings shown in FIG. 3, a very narrow line is machined through the resonator segment mask ring at a distance from the edge about equal to twice the desired etch depth (i.e., radius differential between the resonator segment and the etched adjacent portions), thereby dividing the masked resonator segment ring into a main masked ring and a secondary masked ring. The etch process is permitted to proceed (both longitudinally as well as radially) until two of the etched portions just meet (i.e., when the secondary masked ring just disappears), yielding the radially-extending radially-tapered transverse flange 211 shown in FIG. 9C. The taper-positioner serves to provide reproducible and stable positioning of the fiber-optic-taper segment 116 against the flange 211 and the resonator segment 100. A portion of the secondary masked ring may be machined away prior to etching, so that the flange 211 extends only partly around the circumference of the resonator fiber, thereby suppressing the ability of flange 211 to support undesirable optical modes.

An alternative taper positioner is illustrated in FIG. 9D, comprising a pair of longitudinally-juxtaposed radially-extending radially-tapered transverse flanges 212 positioned on outer circumference of the resonator segment 100 so that the fiber-optic-taper segment may rest on paired flanges. Any of the cylindrical processing methods disclosed herein may be employed to produce the paired flanges 212. A preferred method may comprise a two-step implementation of the surface-masked etching process of FIG. 3. After surface-masked etching to produce the fiber-ring resonator segment 100, a narrow line is machined in the mask material around the longitudinal midline of the masked fiber ring. Upon etching, the concave groove is formed between two circumferential ridges. The etch process is permitted to continue until the flat tops of the ridges just disappear. A fiber-optic-taper segment may then rest securely against the paired flanges 212 for reproducibly established and stably maintained evanescent optical coupling between the fiber-optic-taper segment 116 and resonator segment 100.

In addition to stable mechanical engagement of the fiber-optic-taper segment and the resonator segment, flanges 211 and 212 provide other beneficial effects. It has been observed that when a fiber-optic-taper segment is brought into direct mechanical contact with the outer circumference of a fiber-ring resonator, the proximity of the fiber-optic-taper segment seems to induce coupling between undesirable, delocalized optical modes of the fiber-ring resonator and/or resonator fiber and/or higher order modes of the fiber optic taper. This manifests itself as an unacceptably large optical loss of the fiber-ring resonator (over and above the desired resonator optical losses due to evanescent coupling to the fiber-optic taper, optical modulator, second fiber-optic waveguide, or other component of the resonant optical control device). By displacing the fiber-optic-taper segment from the midline of the fiber ring resonator outer circumference (either longitudinally or radially), the undesirable coupling to these delocalized optical modes can be substantially reduced or eliminated, albeit the expense of reduced coupling strength between the fiber-optic-taper segment and the fiber-ring resonator. Flange 211 serves to position the fiber-optic taper segment 116 in a longitudinally-displaced position relative to fiber-ring resonator segment 100, while flanges 212 serve to position fiber-optic-taper segment in a radially-displaced position relative to fiber-ring resonator segment 100.

The mechanical stability of fiber-optic-taper segment 116 evanescently optically coupled to fiber-ring resonator segment 100 with taper positioner 211 or 212 may be further enhanced by tacking or welding the taper segment to the fiber ring resonator and/or taper positioner. A preferred method for doing so comprises "spot welding" the taper to the positioner or fiber-ring with a short burst from a $CO_2$ laser. The mechanical stability of the optical system is enhanced while typically introducing only minimal additional insertion loss into the fiber-optic-tapered waveguide.

In order to achieve and maintain reliable, reproducible, and stable evanescent optical coupling between a transmission optical waveguide, a circumferential-mode resonator, and an optical modulator (for a resonant optical modulator) or second optical waveguide (for a resonant optical filter) during and after manufacture of a resonant optical power control device according to the present invention, an alignment device may be employed, as illustrated by the exemplary assemblies of FIGS. 11-14. Such an alignment device may comprise a first alignment substrate 502 having a transmission-waveguide-alignment groove 506 thereon, and various embodiments are described in detail in earlier-cited applications A4, A5, and A7. Alignment substrate 502 may be further provided with a circumferential-mode-resonator-alignment groove 504, or groove 504 may be provided on a second alignment substrate 702. A method for fabricating a resonant optical power control device according to the present invention comprises the steps of: 1) positioning and securing a transmission fiber-optic waveguide within the transmission-waveguide-alignment groove 506; and 2) positioning and securing the circumferential-mode optical resonator within the resonator-alignment groove 504 (as shown, for example, in 11A-11C for the case when grooves 504 and 506 are both provided on substrate 502). The transmission fiber-optic- waveguide may comprise a fiber taper 600, an optical fiber with a saddle-shaped evanescent optical coupling segment, a D-shaped optical fiber, or any other functionally equivalent transmission optical waveguide having an evanescent coupling segment. The circumferential-mode resonator may comprise a fiber-ring 602 connected to adjacent portions 604, or any other functionally equivalent circumferential-mode resonator structure. Notwithstanding the exemplary combinations shown in the Figures, any suitable circumferential-mode resonator may be combined with any suitable transmission fiber-optic waveguide to yield a resonant optical power control device according to the present invention. The transmission-waveguide-alignment groove 506 may be positioned on the alignment substrate 502, and resonator-alignment groove 504 may be positioned on the alignment substrate 502 or 702, so that when positioned and secured therein (and substrates 502 and 702 are assembled, if groove 504 is provided on substrate 702), the transmission fiber-optic waveguide and the circumferential-mode resonator are in substantial tangential or circumferential engagement (preferably mechanical contact between a fiber-optic-taper segment and a taper-positioner provided for the fiber-ring resonator, as described above), thereby evanescently optically coupling the circumferential-mode resonator to the transmission fiber-optic waveguide.

Figure 15:
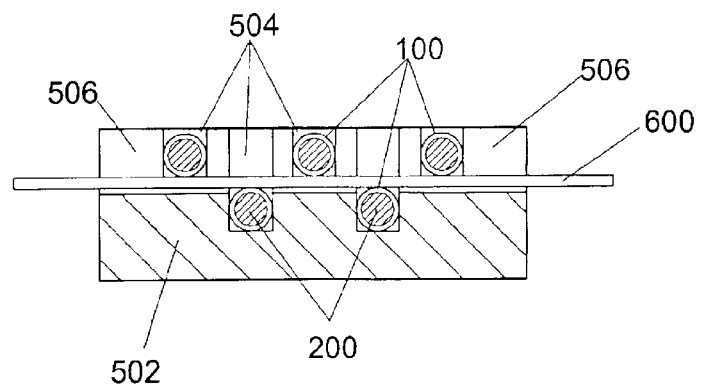
FIG. 15 is a cross-sectional views (looking along a resonator-alignment groove) of an optical power control device according to the present invention.

As shown in the Figures, the resonator-alignment groove and the fiber-alignment groove may preferably be substantially perpendicular, so that the fiber and circumferential-mode resonator may be substantially co-planar. The alignment grooves may have substantially constant width and depth profiles along their respective lengths, or alternatively may have tailored width and/or depth profiles. The cross-sectional shape of the alignment grooves may preferably be substantially rectangular (in fact probably slightly trapezoidal due to laser machining), but may alternatively have any suitable cross-sectional shape suitable for positioning and securing the circumferential-mode resonator and the transmission optical fiber. The depths of the resonator-alignment groove and fiber groove are preferably chosen so that when positioned and secured therein, the fiber and a fiber-taper positioner of the circumferential-mode resonator are in direct contact and therefore optically coupled in a reproducible, reliable, and stable manner. The depths chosen depend on the mechanical configurations of the circumferential-mode resonator and the transmission fiber, as may be readily determined for a particular configuration by one skilled in the art. Either the fiber-alignment groove or the resonator-alignment groove may be the deeper groove, and typically the component (fiber or resonator) corresponding to the deeper groove is positioned and secured in its respective groove first, and the other component positioned and secured after the first, although this need not always be the case. For example, if a plurality of circumferential-mode resonators are to be coupled in series to a single transmission optical fiber (a plurality of resonant optical modulators for independently modulating multiple optical signal channels, for example), it may be preferable to tangentially or circumferentially engage the transmission optical fiber alternately (by ones or twos) from opposite sides to ensure reproducible optical coupling with all of the circumferential-mode resonators. It may be desirable in this instance to provide two alignment substrates with alignment grooves on opposing faces thereof, thereby allowing access to opposing sides of a transmission optical fiber positioned within a fiber alignment groove thereof. Alternatively, alignment grooves may be provided at three or more operational depths: a deepest set of one or more resonator-alignment grooves, an intermediate fiber-alignment groove, and a shallowest set of one or more resonator-alignment grooves (FIG. 15).

Any of a variety of functionally equivalent methods may be employed for securing the transmission optical fiber and/or the circumferential-mode resonator within the respective alignment groove, including but not limited to: application of adhesives, epoxies, resins, polymers, solders, and the like; welding or fusing; and providing a mechanical retainer for retaining the transmission fiber and/or circumferential-mode resonator within the respective alignment groove, such as a clamp, clip, fastener, plate, or other like device. In an alternative embodiment of an optical power control device, the transmission optical fiber may be fused or welded (with a $CO_2$ laser, for example) to the circumference of a circumferential-mode resonator to insure stable, reliable, and reproducible optical coupling. Once the transmission optical fiber and circumferential-mode resonator have each been positioned and secured within the respective alignment groove, the alignment device may be sealed (preferably hermetically sealed) to isolate the fiber and resonator from the use environment of the optical power control device. This is important for a number of reasons. First, the optical coupling relies on the propagation of evanescent optical waves from free surfaces of the transmission fiber and circumferential-mode resonator. Any contamination of these free surfaces may drastically alter the optical properties of the fiber and/or resonator and/or optical coupling thereof, thereby altering the performance of the optical power control device. Similarly, any movement of the transmission optical fiber relative to the circumferential-mode resonator may also alter the optical coupling and performance of the control device. The alignment device may comprise a cover, second substrate, or other functionally equivalent component that may be positioned over the alignment grooves and sealed into place (using adhesives, epoxies, resins, polymers, solders, and/or the like; or using welding or fusion), leaving the two ends of the transmission optical fiber exposed for connecting to an optical power transmission system.

Figure 16:
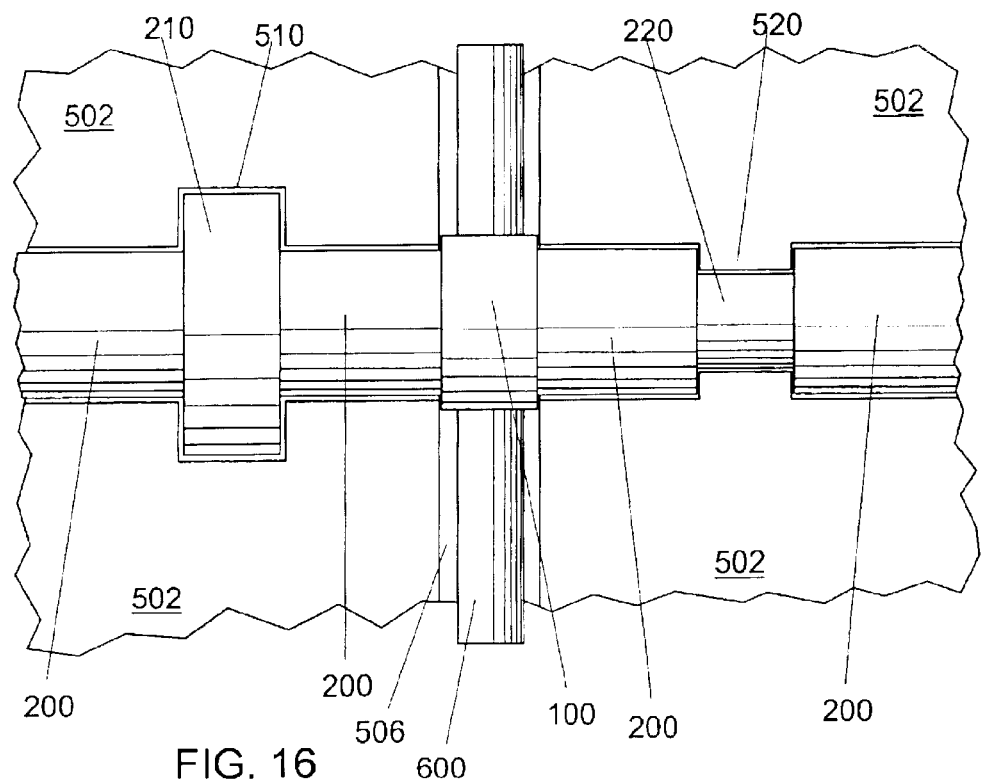
FIG. 16 is a top view of a circumferential-mode resonator on an optical fiber having alignment structures thereon that are engaged with corresponding alignment structures in resonator-alignment groove according to the present invention.

In a preferred embodiment of a optical power control device according to the present invention, a circumferential-mode fiber-ring resonator is employed having been fabricated from an optical fiber as disclosed hereinabove. A fiber-ring resonator may be particularly well-suited for use in the optical power control device fabrication methods described herein. The adjacent portions may serve to reproducibly, reliably, and stably position the fiber-ring resonator segment within the resonator-alignment groove, particularly in directions substantially orthogonal to the longitudinal axis of the resonator segment and adjacent portions. Proper longitudinal positioning is required so that the transmission optical fiber 600 engages the resonator segment 100 and not an adjacent portion 200. This may be most simply accomplished by providing a blind resonator-alignment groove 504, truncating an adjacent portion 200 at an appropriate length, and positioning the circumferential-mode resonator 100 in resonator-alignment groove 504 so that the truncated end of adjacent portion 200 butts up against the blind end of resonator-alignment groove 504. If the truncated end is angle polished and the blind groove end is angled, rotation of the fiber may serve to adjust the lateral position of the circumferential-mode resonator. Alternatively, alignment structures provided on the adjacent portions may serve to properly longitudinally position the circumferential-mode resonator within the resonator-alignment groove (FIGS. 9A and 9B). Preferred alignment structures that may be provided on one or more of the adjacent portions 200 may comprise circumferential grooves 220 and/or circumferential annular flanges 210 for engaging corresponding alignment members (flanges 520 and/or grooves 510, respectively) that may be provided in the resonator-alignment groove 504 of the alignment device 500 (FIG. 16). Details of fabrication of a circumferential-mode resonator having such alignment members are disclosed hereinabove. Other suitable alignment members may be employed while remaining within the scope of inventive concepts disclosed and/or claimed herein.

A major portion of the cost associated with manufacture of optical power control devices arises from the labor-intensive steps involved in properly aligning the components of the device. Often active alignment techniques are required wherein some measure of device performance (examples include insertion loss, modulation depth, bandwidth, and so forth) is monitored and optimized with respect to alignment of components of the device. Such active alignment steps are reduced or substantially eliminated from fabrication of a resonant optical power control device according to the present invention. In particular, appropriate depths chosen for the resonator-alignment groove and the fiber-alignment groove, and circumferential grooves and/or annular flanges provided on an adjacent portion and appropriately positioned mating structures in the resonator-alignment groove for engaging the adjacent portion, both serve to enable positioning the circumferential-mode resonator segment in substantial engagement with the transmission fiber when each is positioned within the respective alignment groove, without any need for active monitoring of device properties during assembly and/or alignment. Such passive alignment techniques substantially reduce manufacturing time and cost, and substantially enhance reliability and consistency of the manufactured devices.

The transmission optical fiber 600 may preferably be provided with a fiber-optic-taper segment 604. Such a taper may be provided, for example, in a single-mode optical fiber by heating a segment of the fiber while pulling on the ends of the fiber. For a typical single-mode fiber having an outer diameter (core plus cladding) of about 125 $\mu$m, for example, this procedure results in a smoothly varying fiber diameter which decreases from about 125 $\mu$m to between about 1 $\mu$m to about 10 $\mu$m and then increases to about 125 $\mu$m, over a taper length of at least a few hundred microns ranging up to several millimeters of even centimeters. Taper segments between about 2 $\mu$m and about 4 $\mu$m in diameter over a taper length of about a millimeter or two are preferred, and may be obtained by heating and pulling a reduced-diameter fiber (described further below). The smooth variation in fiber diameter permits virtually lossless transmission of a traveling optical wave along the fiber. However, the optical wave comprises a significant evanescent portion extending radially beyond the circumference of the narrow part of the taper. Upon assembly of an optical power control device according to the present invention, the fiber taper segment of the transmission optical fiber and the circumferential-mode resonator segment may each be positioned and secured in respective alignment grooves so that the resonator segment is in substantial tangential or circumferential engagement (in mechanical contact with a fiber-taper positioner, for example) with the fiber taper segment. As described earlier herein, appropriate depths of the alignment grooves and mating alignment structures on the adjacent portions and resonator-alignment groove may be employed to enable reproducible, reliable, and stable optical coupling of the circumferential-mode and the fiber taper segment without resorting to complicated and/or labor-intensive active alignment procedures.

Figure 17:
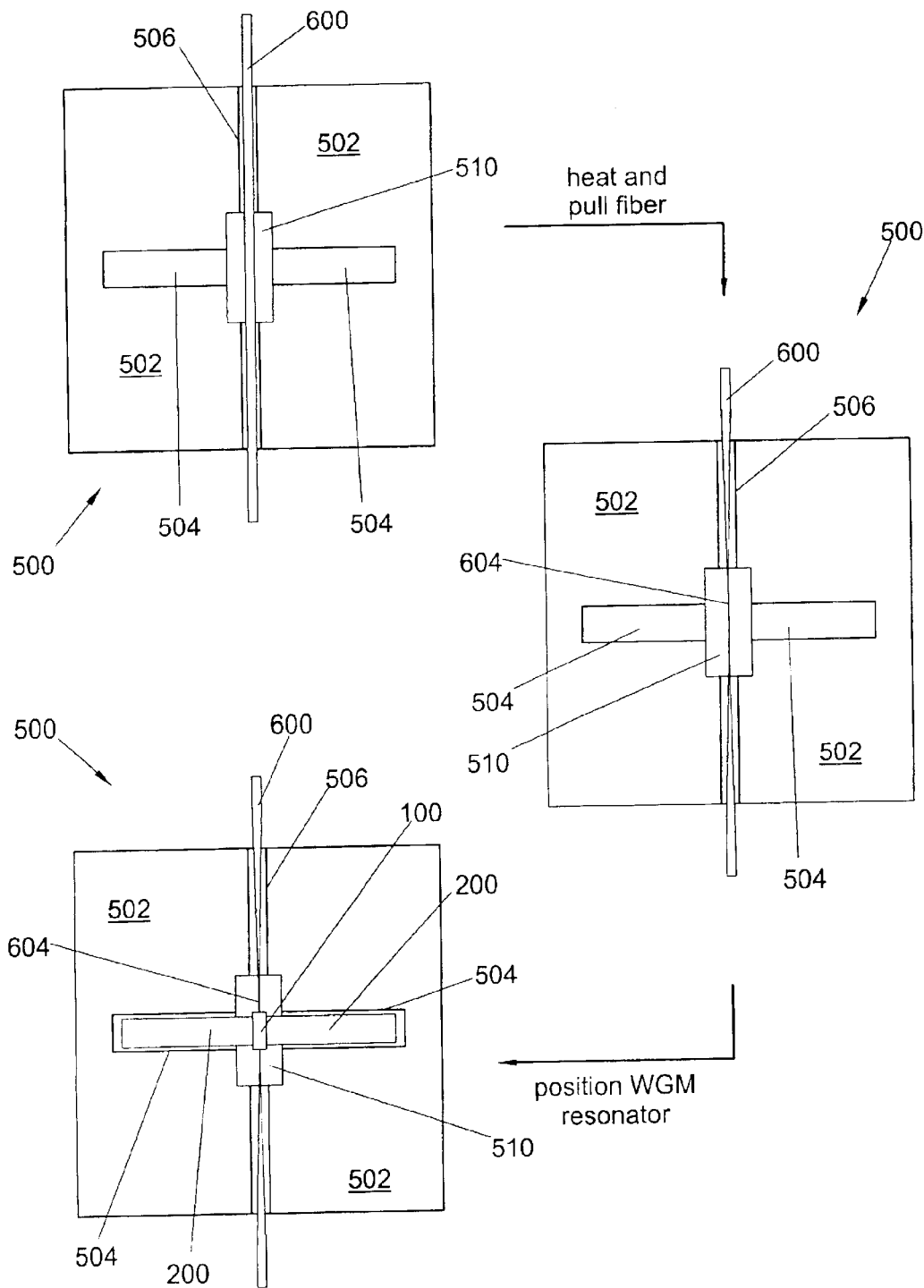
FIG. 17 illustrates a method for assembling an optical power control device on an alignment substrate according to the present invention.

The fiber taper segment described hereinabove may often prove to be quite fragile, and may be subject to frequent breakage during assembly of an optical power control device according to the present invention. Therefore, in an alternative fabrication method according to the present invention (illustrated in FIG. 17), a non-tapered transmission optical fiber 600 may be positioned in the fiber-alignment groove 506. After such positioning, the transmission fiber 600 may then be heated (by a flame or $CO_2$ laser at the point where it crosses the eventual position of the circumferential-mode resonator) and pulled, thereby yielding a fiber taper segment 604. The fiber taper segment 604 is thereby already positioned within the fiber-alignment groove 506 without being subjected to breakage. The transmission optical fiber (and fiber taper segment thereof) may subsequently be secured within the fiber-alignment groove. In order to facilitate this in situ heating and pulling of the transmission fiber to generate a fiber taper segment, the fiber-alignment groove 506 may preferably be provided with an enlarged central portion 510, deeper and/or wider than the remaining end portions of the fiber-alignment groove 506. The enlarged portion of the fiber-alignment groove preferably corresponds to the eventual location of the fiber taper segment 604 and resonator segment 100, and reduces or substantially eliminates mechanical and/or thermal contact between the alignment substrate 502 and the portion of the transmission optical fiber 600 that is heated and pulled to form the fiber taper segment 604. In this way, thermal and/or mechanical disturbances that may distort and/or degrade the fiber taper segment during heating and pulling may be reduced and/or substantially eliminated, thereby enabling reliable and reproducible production of the fiber taper segment. It may be desirable for the enlarged portion 510 of the groove 506 to extend through the alignment substrate 502 so that the flame or $CO_2$ laser used to heat the fiber does not also heat and/or damage the alignment substrate 502.

Fiber tapers may be pulled from standard single-mode optical fiber or polarization preserving optical fiber ("panda", elliptical core, or other) which typically has a cladding outer diameter of about 125 $\mu$m and a core diameter of between about 5 $\mu$m and about 10 $\mu$m. When heated and pulled to yield a fiber taper having the desired diameter (between about 1 and about 10 $\mu$m, preferably between about 2 $\mu$m and about 4 $\mu$m), the length of the taper section may typically reach about 10 to 20 mm in length, necessitating a relatively long fiber-alignment groove, and relatively large alignment substrate and alignment device. This relatively long fiber taper segment may also reduce the stability of the optical power control device, since the relatively long fiber taper segment may move within the enlarged portion of the fiber-alignment groove thereby changing the degree of optical coupling between the fiber taper segment and the circumferential-mode resonator. This problem may be mitigated, and the overall sizes of the fiber-alignment groove and alignment substrate reduced, by pre-thinning the transmission optical fiber before heating and pulling to produce a fiber taper segment. A 125 $\mu$m fiber may be pre-thinned by etching or heating/pulling to a diameter of about 50 $\mu$m. This fiber thickness is still sufficiently robust to withstand positioning with a fiber-alignment groove. Heating and pulling the pre-thinned fiber to a diameter of 2–3 $\mu$m may also be performed in situ without the need for an enlarged portion of the fiber-alignment groove and yielding a shorter and therefore more mechanically stable fiber taper segment. Additionally it is found that pre-etching provides a more robust means of achieving a low insertion loss taper.

The embodiment of FIG. 15 suggests a method for even more reproducible and stable evanescent optical coupling between a fiber-optic-taper segment and a fiber-ring optical resonator. By wrapping the fiber-optic-taper segment partially around the fiber-ring resonator, an extended region for evanescent optical coupling is created. Furthermore, the level of evanescent optical coupling is adjustable, since the degree of coupling is directly related to the interaction length. When used in conjunction with the fiber-taper positioners described hereinabove, wrapping the taper around the fiber-ring optical resonator enables essentially full adjustment of the coupling condition of the fiber-optic taper and the fiber-ring resonator, from an under-coupled condition at first tangential contact, through critical coupling, to an over-coupled condition. In the absence of additional optical loss due to a modulator or other component, a preferred degree of coupling results in about 90% transmission through the taper on resonance, yielding linewidths commensurate with typical WDM or DWDM systems. The taper may be wrapped around the fiber-ring resonator to any desired degree, but wrapping angles between about 0° and about 180° are typical, and angles between about 45° and about 180° are preferred Generally, an interaction length on the order of 50 $\mu$m to about 150 $\mu$m result in a degree of coupling in the desired range.

Figure 18:
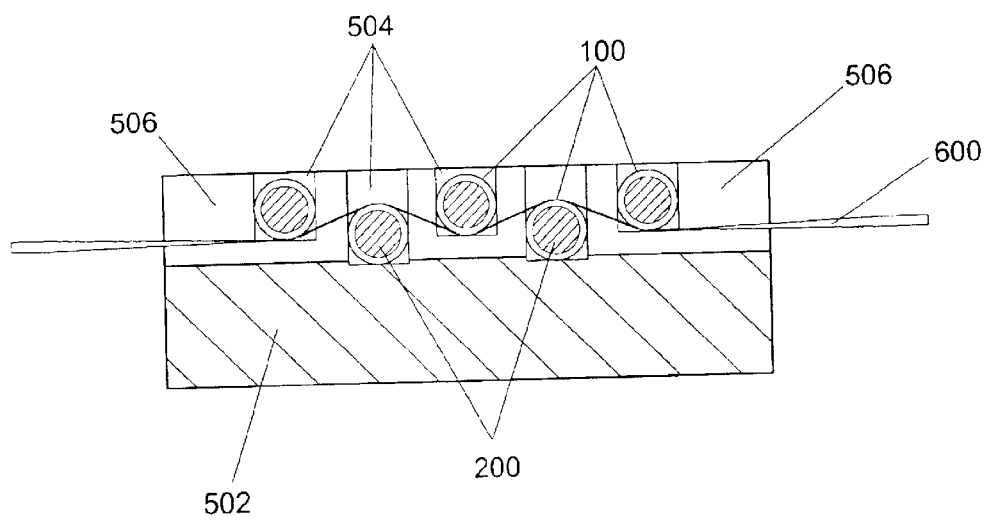
FIG. 18 is a cross-sectional views (looking along a resonator-alignment groove) of an optical power control device according to the present invention.
Figure 11A:
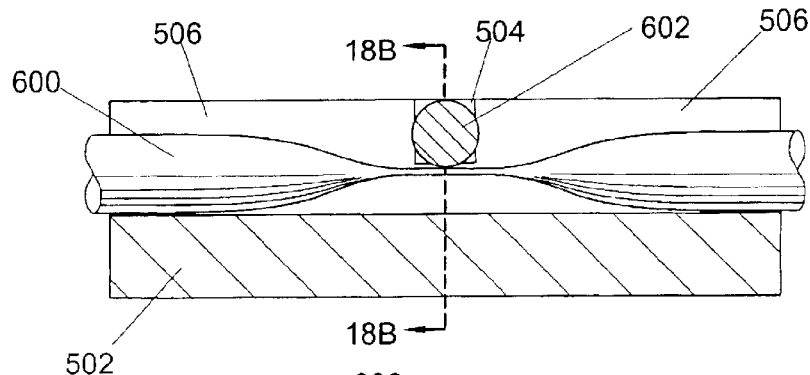
FIGS. 11A, 11B, and 11C are two partial sectional views and one top view, respectively, of an optical power control device according to the present invention.
Figure 11B:
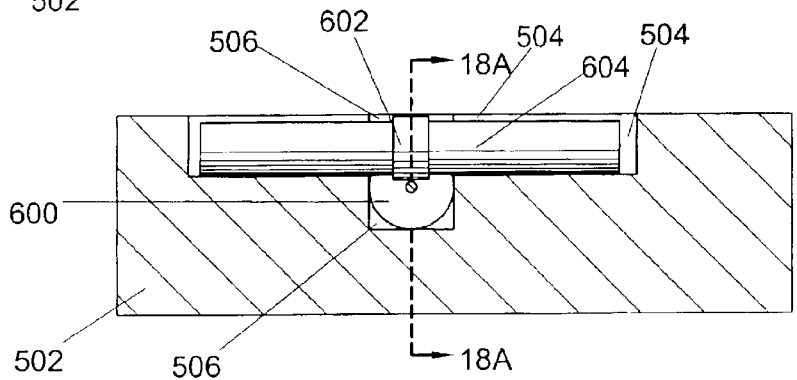
Figure 11C:
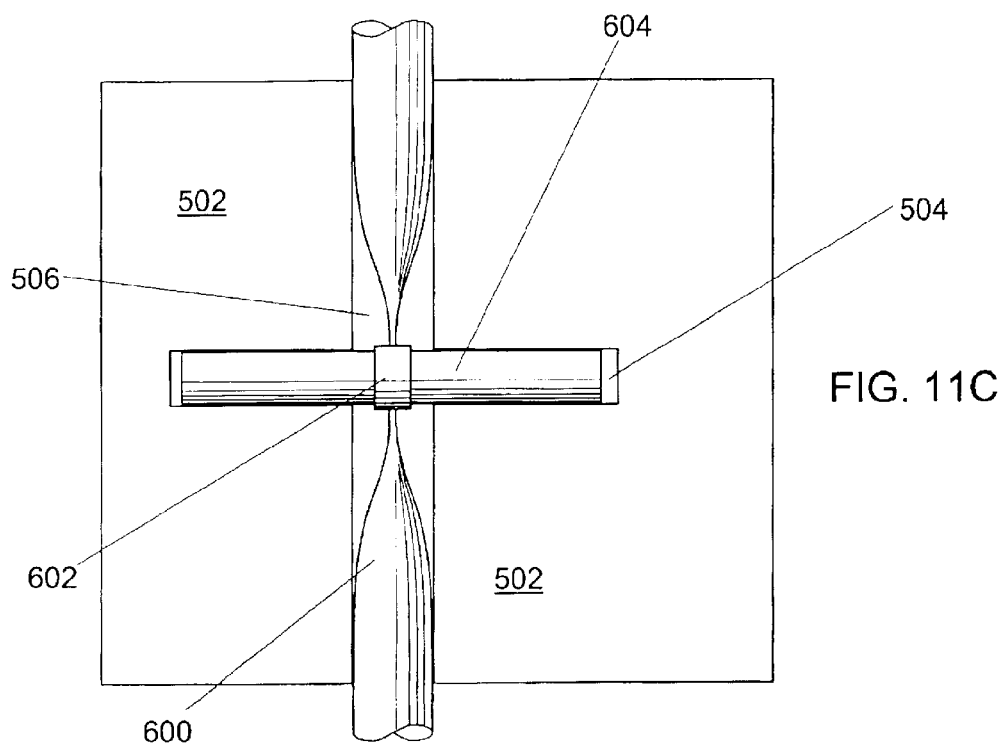
Figure 12A:
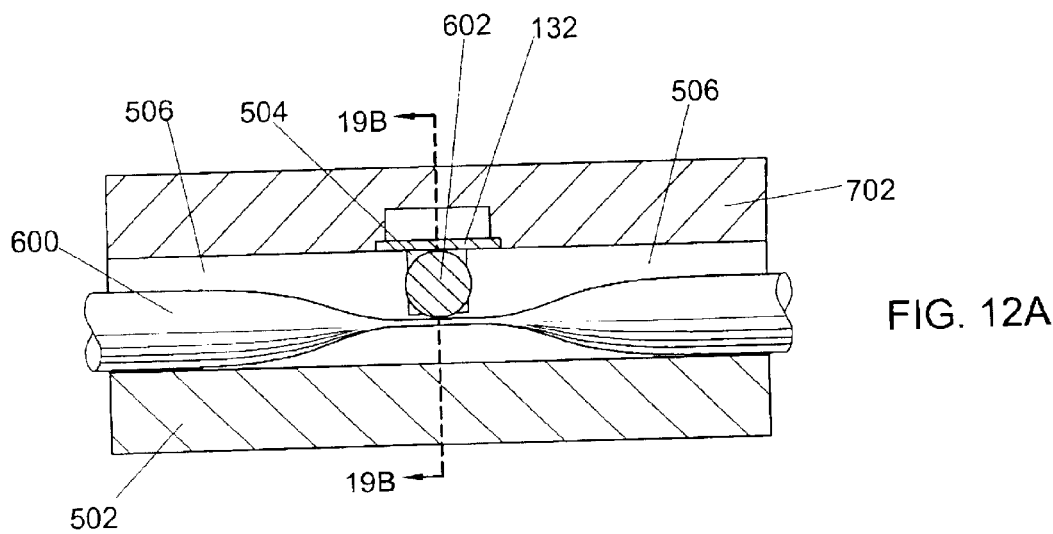
FIGS. 12A and 12B are partial sectional views of an optical power control device according to the present invention.
Figure 12B:
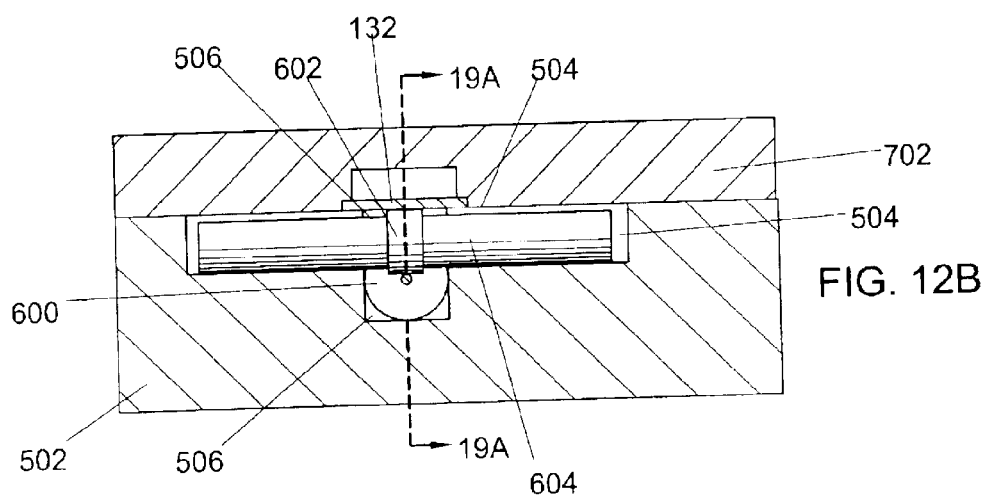

In the embodiment of FIG. 18, a single fiber-taper is shown following a serpentine path through a series of vertically displaced fiber-rings. The depths of the grooves, fiber ring diameters, and distance between the fiber-rings determines the angular range of the wrapping (or equivalently, the interaction length for evanescent optical coupling). Once the desired degree of wrapping is determined (through some experimentation), the appropriate dimensions can be used to fabricate an alignment substrate for producing the desired wrapping. Each of the fiber rings of FIG. 18 may be a fiber-ring resonator, and may function as a component of an optical power control device (modulator, filter, or other). Alternatively, some of the rings (and perhaps all save one) may be provided strictly for providing a reproducible and stable degree of evanescent optical coupling by taper wrapping. One of more of the fiber-rings of FIG. 18 may in fact comprise a pair of tapered flanges, similar to flanges 212 of FIG. 9D. These paired flanges may therefore provide for supported wrapping of a fiber-optic taper with minimal optical interference. The fiber on which the paired flanges are fabricated may be provided with delocalized-optical-mode suppressors for that very reason. The fiber-optic taper may also be welded to one or more of the fiber-rings of FIG. 18. Instead of using fiber rings as taper-wrapping support members in the way, such members may alternatively be incorporated onto the alignment substrate. It is also found that supported wrapping may be used to confine the bent sections of the taper to those sections in which the optical mode is guided by the dielectric/air interface which is essential to reduce bending induced mode coupling effects.

Figure 13A:
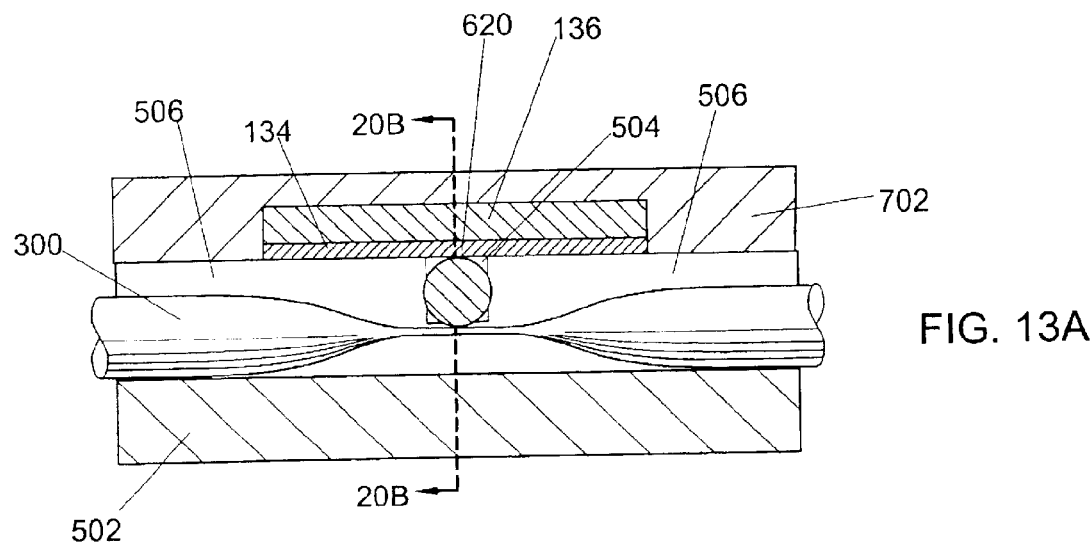
FIGS. 13A and 13B are partial sectional views of an optical power control device according to the present invention.
Figure 13B:
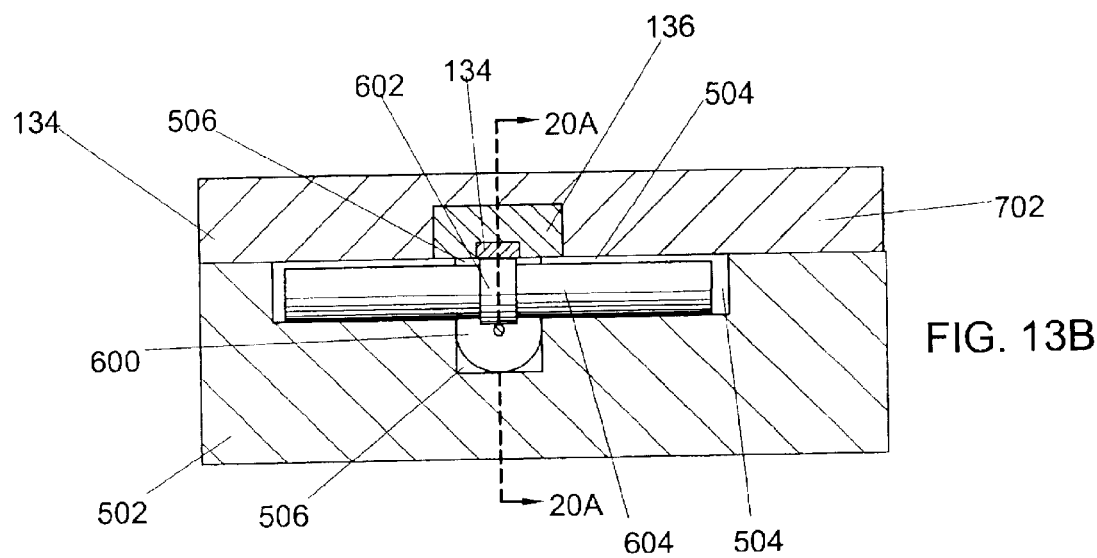
Figure 14A:
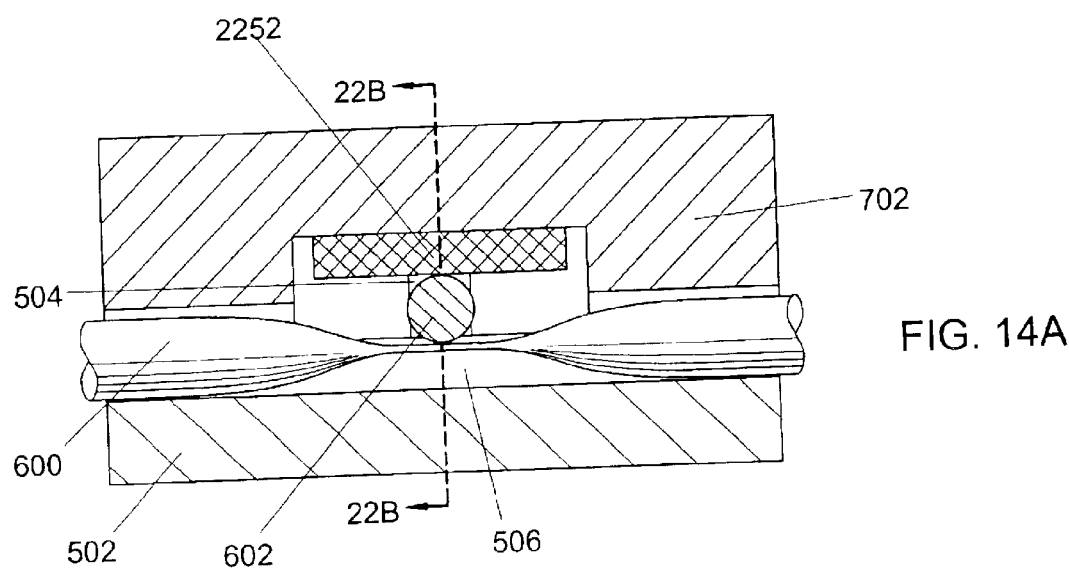
FIGS. 14A and 14B are partial sectional views of an optical power control device according to the present invention.
Figure 14B:
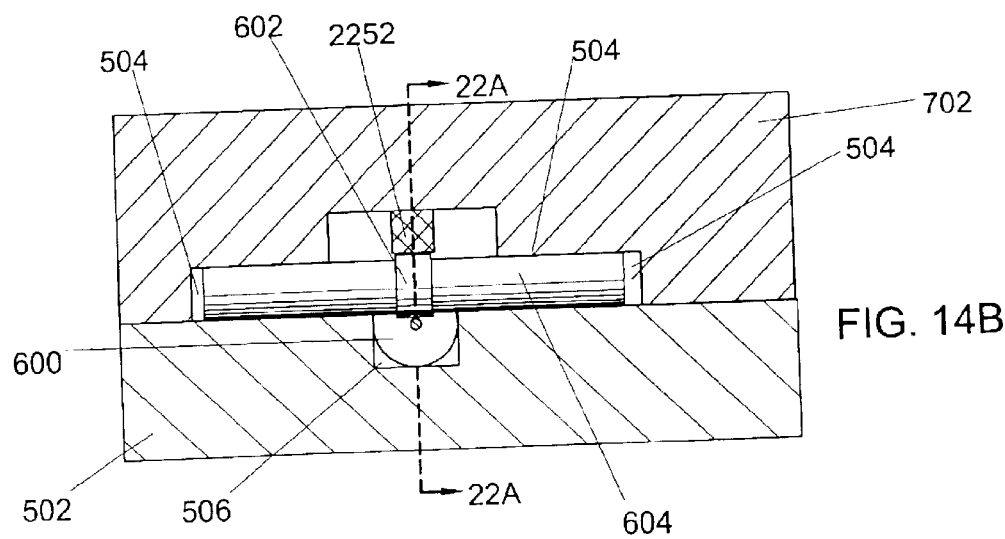
Figure 19:
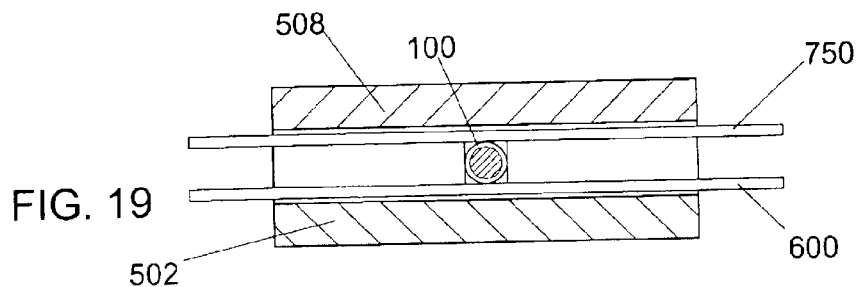
FIG. 19 is a cross-sectional views (looking along a resonator-alignment groove) of an optical power control device according to the present invention.

For a resonant optical modulator, the second alignment substrate 702 of the alignment device may have an optical modulator secured thereto or mounted thereon for a resonant optical modulator, as in FIGS. 12-14. Alternatively, the second transmission optical waveguide may be provided for a resonant optical filter, as in FIGS. 19-21, either on the first alignment substrate (FIG. 20) or on the second alignment substrate (FIGS. 19 and 21). Alignment substrate 702 (and/or alignment substrate 502, if groove 504 is provided thereon) may be suitably mechanically indexed or otherwise provided with means for reliably, reproducibly, and stably positioning the optical modulator for evanescent optical coupling to the circumferential-mode optical resonator (either in direct mechanical contact or a space therebetween). The alignment grooves 504 and 506, and any indexing or other alignment means, together serve to suitably position the optical modulator, circumferential-mode resonator, and transmission fiber-optic waveguide relative to each other, when all are secured to the assembled alignment device.

For a resonant optical modulator, similar alignment substrates may be employed whether the optical modulator is a waveguide or resonator, and whether the optical modulator is loss-modulated, index-modulated, resonance-modulated, or interference-modulated. Exemplary assemblies include: slab modulator waveguide 132 shown in FIGS. 12A-12B (with groove 504 on substrate 502); 2D modulator waveguide 134 on substrate 136 shown in FIGS. 13A-133B (with groove 504 on substrate 502); and ridge modulator waveguide 2252 shown in FIGS. 14A-14B (with groove 504 on substrate 702).

For each of the various modulator structures, methods, and materials recited hereinabove for a circumferential-mode resonator, some sort of control signal must be applied to the modulator. A modulator controller may therefore be provided on the alignment device for providing such signals to a modulator of a circumferential-mode resonator. Such signals may comprise an electronic control signal, an optical control signal, a mechanical control signal, and/or other control signal, and the modulator controller may comprise means for applying such control signals to the modulator. Examples of such means may include, but are not limited to: electrical conductors, wires, cables, electrodes, electrical contacts, ohmic contacts, wireless transmitters and/or receivers, semiconductors, semiconductor hetero-structures (including quantum wells), diodes, triodes, transistors, field-effect transistors (FET's), CMOS devices, integrated circuits, ASIC's, digital circuits, analog circuits, optical fibers, lenses, micro-lenses, mirrors, prisms, integrated optics, adaptive optics, light sources, laser sources, laser diodes, light-emitting diodes (LED's), photo-voltaic devices, photo-conductive devices, piezo-electric devices, electro-strictive devices, actuators, translators, rotators, linear and/or rotary stepper motors, linear and/or rotary servo systems, combinations thereof, and/or functional equivalents thereof. A portion of the modulator controller may reside on and/or within the alignment device, and access to the modulator controller may be provided enabling control of the modulator after hermetic sealing of the alignment device. Such access may comprise feed-through connectors, access ports, embedded conductors and/or optical fibers, and the like for transmitting optical, electronic, or mechanical control signals.

In a resonant optical filter, the second transmission optical waveguide (preferably a fiber-optic waveguide with a fiber-optic taper segment) is positioned in a groove on the alignment substrate, either the first alignment substrate (FIG. 20) or the second alignment substrate (FIGS. 19 and 21). Such a second alignment substrate may be suitably indexed or provided with mating alignment structure(s) to enable reproducible, reliable, and stable alignment of the second optical waveguide with the circumferential-mode resonator when the optical power control device is assembled. The alignment device, including the first transmission optical fiber, the circumferential-mode optical resonator, and the second transmission optical fiber, may be sealed (preferably hermetically sealed) after assembly, as disclosed hereinabove. A cover, the second alignment substrate, or another functionally equivalent component may be positioned over the alignment grooves and sealed into place (using welding, fusion, adhesives, epoxies, resins, polymers, solders, and/or the like), leaving only the two ends of the transmission optical fibers exposed for connecting to an optical power transmission system.

The alignment device, comprising one or more grooved and/or indexed alignment substrates, may be fabricated from a material sufficiently rigid to provide reliable, reproducible, and stable positioning of the transmission optical fiber, circumferential-mode resonator, and any secondary or modulator optical assembly that comprise the optical power control device. Preferred materials may include ceramics or semiconductors such as silicon or a III-V semiconductor, but other material (such as metals, alloys, glasses, crystalline materials, and dielectric materials) may be employed while remaining within the scope of inventive concepts disclosed and/or claimed herein. The fiber-alignment groove and the resonator-alignment groove may be formed by any suitable means for machining (or otherwise processing) the material used. A preferred method for providing the grooves is laser machining (most preferably ablative laser machining with an excimer laser), however, other fabrication techniques may be employed, such as lithographic patterning of a mask followed by wet (chemical) or dry (reactive ion) etching, electric discharge machining, plasma discharge machining, or single wire arc ablation. These same machining/processing techniques may be employed for providing other alignment and/or indexing structures on the alignment device (such as tabs, slots, pins, holes, grooves, and the like).

Figure 20:
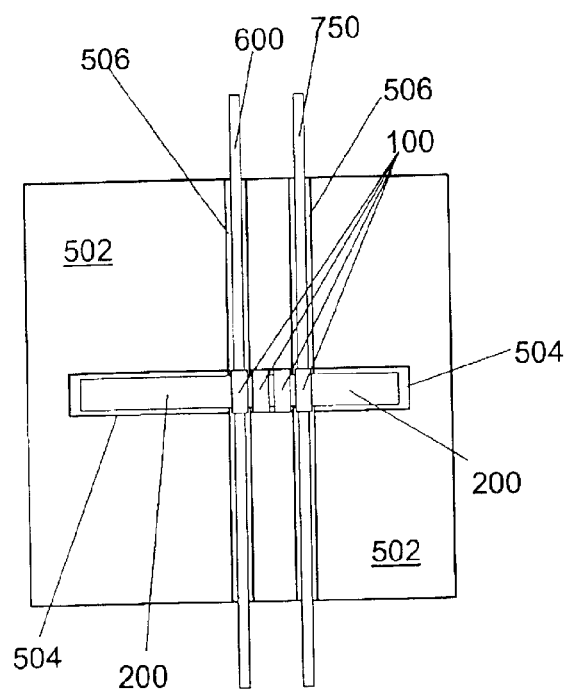
FIG. 20 is a top view of an optical power control device according to the present invention.
Figure 21:
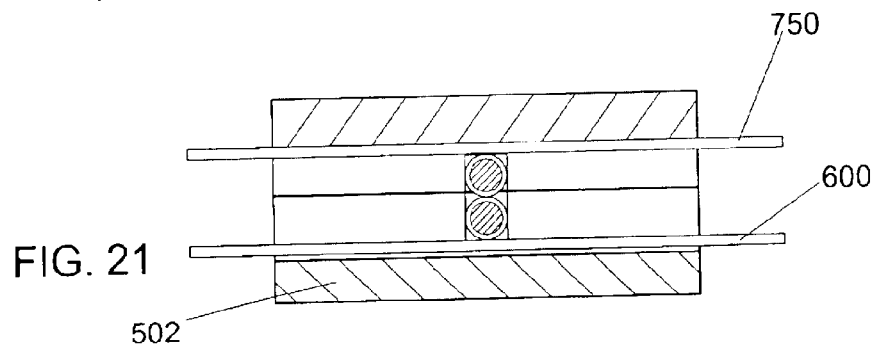
FIG. 21 is a cross-sectional views (looking along a resonator-alignment groove) of an optical power control device according to the present invention.

A resonant optical filter according to the present invention is shown schematically in FIGS. 19-21, in which circumferential-mode optical resonator 100 is evanescently optically coupled to transmission optical waveguides 600 and 750. An optical signal propagating in waveguide 600 and substantially resonant with resonator 100 will be at least partially transferred or routed to waveguide 750. The resonant optical filter may function as a channel dropping filter if only one signal channel transmitted into waveguide 600 is resonant with resonator 100 and therefore routed to waveguide 750. If the evanescent optical coupling between waveguide 600 and resonator 100 is substantially equal to the evanescent optical coupling between waveguide 750 and resonator 100, then (neglecting internal resonator optical loss, which can be made small) the resonant optical channel is substantially completely dropped from waveguide 600 and substantially completely transferred to waveguide 750. Similarly, the resonant optical filter may be used as a channel adding filter if a resonant optical signal enters waveguide 750 and is transferred to waveguide 600. If the evanescent optical coupling is not the same for both waveguides, then the optical signal transfer is incomplete, resulting in division of a resonant optical signal entering the filter.

Figure 22A:
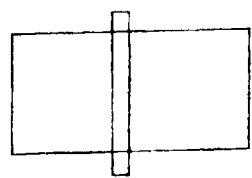
FIGS. 22A and 22B schematically illustrate the spectral properties of a coupled optical resonator systems.
Figure 22A:
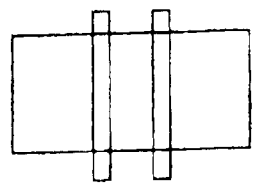
Figure 22A:
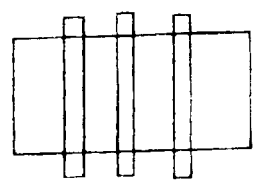
Figure 22A:
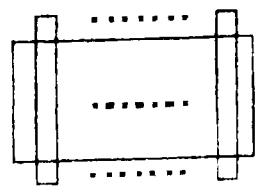
Figure 22B:
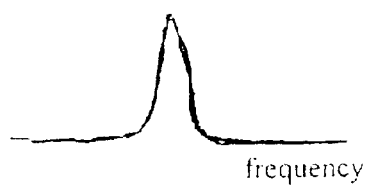
Figure 22B:
Figure 22B:
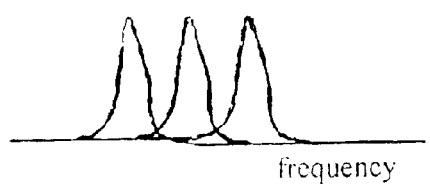
Figure 22B:

If multiple optical signal channels are resonant with resonator 100, then the resonant optical filter may function as an optical slicer and/or optical interleaver, for dividing/combining, respectively, a plurality of optical signals at different wavelengths. The spectral characteristics of the resonances of resonator 100 determine the operational characteristics of the resonant optical filter. If resonator 100 is a single resonator with fairly spectrally narrow resonance peaks, then the resonant optical filter will have correspondingly narrow "transfer peaks" or "routing peaks". The resonance characteristics of the resonant optical filter may be manipulated by optically coupling multiple optical resonators. A system of four coupled resonators is shown in FIG. 20, for example. FIGS. 22A and 22B show the resonance spectra of systems of coupled, substantially identical optical resonators. A single resonator is shown exhibiting a single resonant mode. Two coupled resonators exhibit two resonant modes with differing frequencies (corresponding to symmetric and anti-symmetric linear combinations of the isolated resonator modes, or "supermodes"). In general N coupled resonators will possess N supermodes; the N supermodes are distributed within a frequency band V set by the strength of the inter-ring optical coupling. When V/N is on the order of the resonance linewidth of the individual rings, the supermode resonances are unresolvable and the resulting filter function approximates a square top function. This square top function is useful for a resonant optical filter since it reduces the need to precisely match the filter resonance to the signal channel wavelength. In WDM and DWDM systems, a given signal channel is generally specified to lie within a specified band of frequencies. Using a multiple coupled resonators enables the "routing band" of the resonant optical filter to substantially encompass the band of frequencies of an optical signal channel, facilitating the use of the resonant optical filter.

The spectral spacing between adjacent resonance peaks or resonance bands maybe manipulated to produce a resonant optical filter with particular wavelength dependent routing characteristics, for either single- or multiple-resonator devices. A particularly useful device in WDM and DWDM systems are slicer/interleavers wherein every other optical signal channel is routed from one waveguide to the other. A preferred filter function for such a device would comprise a series of routing bands separated ("center-to-center") by twice the channel wavelength spacing of the WDM or DWDM system and about equal to the channel spacing in width (such channel spacings may range from more than several hundred GHz down to tens of GHz, depending on the particular system). Other slicer/interleaver devices may be constructed wherein the routing peak/band spacing and width are chosen to route other combinations of optical signal channels. For example, the resonance spacing may preferably be chosen to be an integer multiple N of the channel spacing, while the resonance width might be chosen to be an integer multiple M of the channel spacing, with M<N. The resulting filter function would route M consecutive channels out of each successive group of N channels. Other filtering schemes may be implemented without departing from inventive concepts disclosed and/or claimed herein.

Any circumferential-mode optical resonator disclosed herein may be employed in a resonant optical filter according to the present invention. A coupled multiple resonator system may comprise any suitable grouping of coupled optical resonators which includes at least one circumferential optical mode as disclosed herein while remaining within the scope of the present invention. A preferred embodiment is shown in FIG. 20, wherein four fiber-ring optical resonators are shown on a common resonator fiber, the fiber-ring resonators being longitudinally evanescently optically coupled. Fabrication of substantially identical fiber-rings substantially uniformly spaced results in reasonably predictable resonant optical filter functions. A multiple coupled optical resonator system may alternatively include two or more fiber-ring resonators on different fibers and radially evanescently optically coupled, as shown in FIG. 21.

As described above, a resonant optical filter functions as an essentially passive device. Active resonant optical filters may be implemented according to the present invention by adding an optical modulator and modulator controller to a fiber-ring resonator of the resonant optical filter. Any of the loss-, absorption-, or coupling-modulated schemes disclosed herein may be employed as in the case of resonant optical modulators, with the second optical waveguide taking the place of the optical modulator of the resonant modulator. By spoiling the resonance of the fiber-ring resonator by increasing resonator optical loss, for example, the routing function can be "turned off" for the resonant signal channels. Any of the modulation techniques disclosed herein may be adapted for producing active resonant optical filters according to the present invention.

Once coupled into the circumferential-mode optical resonator, dissipation of the optical signal may be modulated to in turn modulate the level of transmission of the propagating optical mode though the fiber-optic waveguide (and hence through the optical power control device), as described in the earlier-cited patent applications A1 through A6. By controllably adjusting the loss per round trip experienced by the circumferential optical mode circulating within the circumferential-mode optical resonator, the optical power control device may function in either of two modes:

1) Switching the circumferential-mode optical resonator between an over-coupled condition (where the loss per round trip in the circumferential-mode optical resonator is small compared to the optical coupling between the fiber-optic waveguide and circumferential-mode optical resonator, and the transmission through the fiber-optic waveguide past the resonator is large) and the condition of critical coupling (at which the optical coupling of the fiber-optic waveguide and circumferential-mode optical resonator is substantially equal to the round trip loss of the circumferential-mode optical resonator, and substantially all of the optical power is dissipated by/from the circumferential-mode optical resonator resulting in near zero optical transmission through the fiber-optic waveguide past the circumferential-mode optical resonator); or 2) Switching states between the condition of critical coupling (near zero transmission through the fiber-optic waveguide) and a condition of under-coupling (where the loss per round trip in the circumferential-mode optical resonator is large compared to the optical coupling between the fiber-optic waveguide and circumferential-mode optical resonator, and the transmission through the fiber-optic waveguide past the circumferential-mode optical resonator is non-zero).

For all of these modes of operation, there are essentially two classes of mechanism by which one can introduce round trip loss to a circulating optical wave (i.e., resonant circumferential optical mode) in the circumferential-mode resonator. Either optical power of the circulating wave can be absorbed, or it can be gated out of the circumferential-mode optical resonator into a second optical element, such as a second waveguide or second resonator. The gating may preferably be achieved by control of the optical coupling between the circumferential-mode optical resonator and the second optical element and functions rather like a trapdoor. These two general possibilities are both disclosed in earlier-cited applications A1, A2, A5, and A6. The current disclosure describes such devices in greater detail, particularly optical loss transducers or elements provided as a separate element to control optical loss from a circumferential-mode resonator by either of these means (as distinguished from designs in which the loss control element is an integral part of the circumferential-mode optical resonator structure).

The modulator may be provided in a variety of ways, including but not limited to: in a circumferential-mode resonator fabricated by providing material on the circumference of a resonator fiber segment, the material provided may enable modification of optical properties of the circumferential-mode resonator; in a circumferential-mode resonator fabricated by spatially-selective doping of a resonator fiber segment, the doped material may enable modification of optical properties of the circumferential-mode resonator; a modulator material may be provided on at least a portion of the circumference of the circumferential-mode resonator and therefore be encompassed by an evanescent portion of the circumferential-mode optical wave extending radially from the resonator fiber segment; an adjacent fiber segment may be truncated sufficiently close to the resonator fiber segment so that at least a portion of the resulting fiber end face is encompassed by a evanescent wave portion of the circumferential-mode optical wave extending longitudinally from the resonator fiber segment, and a modulator material may be provided on the portion of the fiber end face thus encompassed; combinations thereof; and/or functional equivalents thereof. The modulator material (including deposited, bonded, attached, and/or doped material) may include but is not limited to: an electro-optic material; an electro-absorptive material; a non-linear optical material; a semi-conductor material (including hetero-structures such as quantum wells); an optical gain medium (a laser material, for example); a piezo-electric material; combinations thereof; and/or functional equivalents thereof. The modulator may enable controlled modulation of one or more optical properties of the circumferential-mode resonator, including but not limited to: optical gain and/or loss; optical coupling to the circumferential-mode resonator; a resonant frequency of the circumferential-mode resonator; combinations thereof; and/or functional equivalents thereof. For each of the various modulator structures, methods, and materials recited hereinabove for a circumferential-mode resonator, some sort of control signal must be applied to the modulator. A modulator control element may therefore be provided on the alignment device for providing such signals to a modulator of a circumferential-mode resonator. Such signals may comprise an electronic control signal, an optical control signal, a mechanical control signal, and/or other control signal, and the modulator control element may comprise means for applying such control signals to the modulator.

The application of a control signal to a modulator of a circumferential-mode resonator via a modulator control element enables controlled modulation of the optical power transmitted through the transmission optical fiber of the optical power control device. This may be accomplished in a variety of ways, depending on the nature of the modulator employed, and several specific examples follow. Modulating the optical loss of the circumferential-mode resonator between essentially zero loss and the so-called critical-coupling loss (wherein the circumferential-mode resonator loss roughly equals the coupling between the transmission fiber and the circumferential-mode resonator) enables modulation of an optical wave that is resonant with a whispering-gallery mode of the circumferential-mode resonator between about 0% (substantially unattenuated transmission) and about 100% (substantially blocked transmission). A similar result may be obtained by keeping the circumferential-mode optical loss constant while modulating the optical coupling between the transmission optical fiber and the circumferential-mode resonator. Alternatively, modulating a resonant frequency of a circumferential-mode having optical loss substantially equal to the critical-coupling loss may enable similar modulation of an optical wave as the circumferential-mode resonant frequency is moved out of and brought into resonance with, the optical wave. The foregoing are exemplary only, and many other transmission optical fiber modulation schemes may be devised by suitable modulation of circumferential-mode resonator optical properties while remaining within the scope of inventive concepts disclosed and/or claimed herein.

The present invention has been set forth in the forms of its preferred and alternative embodiments. It is nevertheless intended that modifications to the disclosed resonant optical power control devices, components thereof, and methods of fabrication and use thereof may be made without departing from inventive concepts disclosed and/or claimed herein.

What is claimed is:

1. A method for cylindrical processing of an optical medium, comprising the steps of:
   a. rotating an optical medium about a longitudinal relative rotation axis thereof relative to a processing tool; and
   b. spatially selectively applying the processing tool to a portion of a surface of an optical medium, in operative cooperation with relative rotation of the optical medium and the processing tool, thereby producing spatially selective alterations in the optical medium, wherein the optical medium comprises a silica-based optical fiber including a core and a cladding layer, and the alterations include at least one ring.

2. A method for cylindrical processing of an optical medium, comprising the steps of:
   a. rotating an optical medium about a longitudinal relative rotation axis thereof relative to a processing tool; and
   b. spatially selectively applying the processing tool to a portion of a surface of an optical medium, in operative cooperation with relative rotation of the optical medium and the processing tool, thereby producing spatially selective alterations in the optical medium, wherein the optical medium comprises a silica-based optical fiber including a core and a cladding layer, and the alteration includes a spatially selective surface mask.

3. A method for cylindrical processing of an optical medium, comprising the steps of:
   a. rotating an optical medium about a longitudinal relative rotation axis thereof relative to a processing tool; and
   b. spatially selectively applying the processing tool to a portion of a surface of an optical medium, in operative cooperation with relative rotation of the optical medium and the processing tool, thereby producing spatially selective alterations in the optical medium, wherein the optical medium comprises a silica-based optical fiber including a core and a cladding layer, and the optical medium includes a hermetic carbon outer coating and the alteration includes the step of spatially selectively removing the hermetic carbon coating.

4. The cylindrical processing method of claim 2, wherein the processing-tool-applying step includes the step of forming a surface mask by spatially selective deposition of mask material on portions of the optical medium.

5. A method for fabricating a fiber-ring resonator comprising the steps of:
   a. rotating a resonator optical fiber about a longitudinal relative rotation axis thereof relative to a processing tool; and
   b. spatially selectively applying the processing tool to a portion of the optical resonator fiber, in operative cooperation with the relative rotation of the resonator fiber to the processing tool, thereby producing a resonator segment in the resonator fiber, the resonator segment having a circumferential optical path length differing from the circumferential optical path length of the resonator fiber adjacent to the resonator segment.

6. The fabricating method of claim 5, wherein the processing tool deposits material on the resonator fiber.

7. The fabricating method of claim 5, wherein the processing tool removes material from the surface of the resonator fiber adjacent to the resonator segment.

8. The fabricating method of claim 5, further including the step of providing an alignment member on the outer circumference of the resonator segment of the resonator fiber.

9. The fabricating method of claim 5, further including the step of altering the circumferential optical path length of the resonator segment, thereby altering a resonant frequency of a resonator optical mode supported by the resonator segment.

10. A method of fabricating an alignment member by cylindrical processing of an optical fiber, comprising the steps of:
    a. rotating an optical fiber about a longitudinal relative rotation axis thereof relative to a processing tool; and
    b. spatially selectively applying the processing tool to a portion of the optical fiber and the processing tool, thereby producing alterations of the optical fiber including a radially-projecting portion or a radially-recessed portion.

11. A method for producing a spatially selective alteration on a substantially cylindrical optical medium, the method comprising the steps of:

rotating the optical medium about a longitudinal relative rotation axis thereof relative to a processing tool; and spatially selectively applying the processing tool to a portion of the surface of the optical medium, in operative cooperation with relative rotation of the optical medium and the processing tool thereby spatially selectively altering the optical medium to produce the spatially selective alteration thereon, wherein the optical medium comprises an optical fiber, and the optical fiber includes a hermetic carbon outer coating layer.

12. A method for producing a spatially selective alteration on a substantially cylindrical optical medium, the method comprising the steps of:

rotating the optical medium about a longitudinal relative rotation axis thereof relative to a processing tool; and spatially selectively applying the processing tool to a portion of the surface of the optical medium, in operative cooperation with relative rotation of the optical medium and the processing tool thereby spatially selectively altering the optical medium to produce the spatially selective alteration thereon, wherein the optical medium comprises an optical fiber, and the optical fiber comprises a hollow-core optical fiber.

13. A method for producing a spatially selective alteration on a substantially cylindrical optical medium, the method comprising the steps of:

rotating the optical medium about a longitudinal relative rotation axis thereof relative to a processing tool; and spatially selectively applying the processing tool to a portion of the surface of the optical medium, in operative cooperation with relative rotation of the optical medium and the processing tool thereby spatially selectively altering the optical medium to produce the spatially selective alteration thereon, wherein the optical medium comprises an optical fiber, and the optical fiber comprises a hollow-core optical fiber and the hollow core contains an optically scattering material or an optically absorbing material.

14. A method for producing a spatially selective alteration on a substantially cylindrical optical medium, the method comprising the steps of:

rotating the optical medium about a longitudinal relative rotation axis thereof relative to a processing tool; and spatially selectively applying the processing tool to a portion of the surface of the optical medium, in operative cooperation with relative rotation of the optical medium and the processing tool thereby spatially selectively altering the optical medium to produce the spatially selective alteration thereon, wherein the optical medium comprises an optical fiber, and the spatially selective alteration includes at least one ring between first and second segments of the optical fiber.

15. The method of claim 14, wherein the spatially selective alteration includes at least one full ring.

16. The method of claim 14, wherein the spatially selective alteration includes at least one partial ring.

17. A method for producing a spatially selective alteration on a substantially cylindrical optical medium, the method comprising the steps of:

rotating the optical medium about a longitudinal relative rotation axis thereof relative to a processing tool; and spatially selectively applying the processing tool to a portion of the surface of the optical medium, in operative cooperation with relative rotation of the optical medium and the processing tool thereby spatially selectively altering the optical medium to produce the spatially selective alteration thereon, wherein:

the optical medium comprises an optical fiber;

the spatially selective alteration includes spatially selectively removal of optical material from the optical medium;

the processing-tool-applying step includes surface-masked wet etching;

the optical medium is a silica-based optical fiber including a hermetic carbon outer fiber coating;

a surface mask for the optical fiber includes at least a portion of the hermetic carbon outer fiber coating; and surface-masked wet etching is performed with an aqueous hydrofluoric-acid-based etchant.

18. A method for producing a spatially selective alteration on a substantially cylindrical optical medium, the method comprising the steps of:

rotating the optical medium about a longitudinal relative rotation axis thereof relative to a processing tool; and spatially selectively applying the processing tool to a portion of the surface of the optical medium, in operative cooperation with relative rotation of the optical medium and the processing tool thereby spatially selectively altering the optical medium to produce the spatially selective alteration thereon, wherein:

the optical medium comprises an optical fiber;

the spatially selective alteration includes spatially selective alteration of a refractive index of the optical medium;

the refractive index is increased by spatially selective optical-irradiation-induced densification of the optical medium; and the optical fiber is a germano-silica optical fiber.

19. The method of claim 18, wherein the germano-silica optical fiber is a pre-etched germano-silica-core multi-mode optical fiber.

20. The method of claim 18, wherein the germano-silica optical fiber is hydrogen-loaded before irradiation.

21. The method of claim 18, wherein the germano-silica optical fiber is boron co-doped germano-silica optical fiber.

22. A method for producing a spatially selective alteration on a substantially cylindrical optical medium, the method comprising the steps of:

rotating the optical medium about a longitudinal relative rotation axis thereof relative to a processing tool; and spatially selectively applying the processing tool to a portion of the surface of the optical medium, in operative cooperation with relative rotation of the optical medium and the processing tool thereby spatially selectively altering the optical medium to produce the spatially selective alteration thereon;

wherein:

the optical medium comprises an optical fiber;

the processing-tool-applying step includes the steps of i) controlling relative longitudinal motion of the optical medium and the processing tool, and ii) controlling relative radial motion of the optical medium and the processing tool; and application of the processing tool to the optical fiber is synchronous with relative rotation of the optical fiber and the processing tool thereby producing a partial ring.

23. The method of claim 22, wherein the processing tool comprises a processing beam, the processing beam being synchronously attenuated while the optical medium is rotated thereby producing a partial ring.

24. An apparatus for producing a spatially selective alteration on a substantially cylindrical optical medium, the apparatus comprising:

a processing tool;

an optical medium rotator, the rotator being adapted for rotating the optical medium about a longitudinal relative rotation axis thereof relative to the processing tool; and a processing tool positioner, the positioner being adapted for spatially selectively applying the processing tool to a portion of the surface of the optical medium in operative cooperation with relative rotation of the optical medium and the processing tool thereby altering the optical medium to produce the spatially selective alteration thereon, wherein:

the processing tool includes a processing beam source and a processing beam delivery assembly for spatially selectively delivering the processing beam to the optical medium; and the processing tool positioner includes a shadow-mask adapted for spatially-selectively applying the processing beam to the optical fiber.

25. A method for fabricating at least one fiber-ring resonator on a resonator optical fiber, the fiber-ring resonator comprising a transverse fiber-ring resonator segment integral with the resonator optical fiber between first and second segments of the resonator optical fiber, the resonator segment having a circumferential optical path length sufficiently different from a circumferential optical path length of an immediately adjacent portion of the first segment or the second segment of the resonator optical fiber so as to enable the resonator segment to support at least one resonant optical mode near an outer circumferential surface of the resonator segment, the method comprising the steps of:

rotating the resonator optical fiber about a longitudinal relative rotation axis thereof relative to a processing tool; and spatially selectively applying the processing tool to at least a portion of a surface of the resonator optical fiber thereby producing a difference between the circumferential optical path length of the resonator segment and the circumferential optical path length of the immediately adjacent portion of the first or the second segment of the resonator optical fiber.

26. The method of claim 25, wherein the resonator segment is greater than about 1 μm in width.

27. The method of claim 25, wherein the resonator segment is greater than about 2 μm in width.

28. The method of claim 25, wherein the resonator segment is less than about 10 μm in width.

29. The method of claim 25, wherein the resonator segment is less than about 4 μm in width.

30. The method of claim 25, wherein the resonator segment is greater than about 10 μm in diameter.

31. The method of claim 25, wherein the resonator segment is greater than about 20 μm in diameter.

32. The method of claim 25, wherein the resonator segment is greater than about 100 μm in diameter.

33. The method of claim 25, wherein the resonator segment is greater than about 400 μm in diameter.

34. The method of claim 25, wherein the resonator segment is greater than about 500 μm in diameter.

35. The method of claim 25, wherein the resonator segment is less than about 150 μm in diameter.

36. The method of claim 25, wherein the resonator segment is less than about 200 μm in diameter.

37. The method of claim 25, wherein the resonator segment is less than about 600 μm in diameter.

38. The method of claim 25, wherein the resonator segment is less than about 1000 μm in diameter.

39. The method of claim 25, wherein a spectral width of a resonance band of the fiber-ring optical resonator is smaller than an optical channel spacing of the optical WDM system.

40. The method of claim 25, wherein comprising wherein a spectral width of a resonance band of the fiber-ring optical resonator is substantially equal to an optical channel spacing of the optical WDM system.

41. The method of claim 25, wherein a spacing between spectrally-adjacent resonance bands of the fiber-ring optical resonator is greater than an optical channel spacing of the optical WDM system.

42. The method of claim 25, wherein spectrally-adjacent resonance bands of the fiber-ring optical resonator are spaced by about an integer times an optical channel spacing of the optical WDM system.

43. The method of claim 42, wherein the optical WDM system is an optical DWDM system having a channel spacing less than about 400 GHz.

44. The method of claim 42, wherein spectrally-adjacent resonance bands of the fiber-ring optical resonator are spaced by about twice the optical channel spacing of the optical WDM system.

45. The method of claim 25, wherein applying the processing tool to the resonator optical fiber includes removing material from the immediately adjacent portions of the first segment or the second segment of the resonator optical fiber so that a radius of the resonator segment is sufficiently larger than a radius of the immediately adjacent portion of the first segment or the second segment of the resonator fiber so as to enable the resonator segment to support at least one resonant optical mode near an outer circumferential surface of the resonator segment.

46. The method of claim 45, wherein the resonator segment of the resonator fiber is at least about 0.1 μm larger in radius than the immediately adjacent portion of the first segment or the second segment of the resonator fiber.

47. The method of claim 45, wherein the resonator segment of the resonator fiber is at least about 0.5 μm larger in radius than the immediately adjacent portion of the first segment or the second segment of the resonator fiber.

48. The method of claim 45, wherein the resonator segment of the resonator fiber is at most about 20 μm larger in radius than the immediately adjacent portion of the first segment or the second segment of the resonator fiber.

49. The method of claim 45, wherein the resonator segment of the resonator fiber is at most about 1.5 μm larger in radius than the immediately adjacent portion of the first segment or the second segment of the resonator fiber.

50. The method of claim 45, wherein material is removed from the resonator optical fiber by surface-masked wet etching of the resonator optical fiber.

51. The method of claim 50, further comprising the step of producing a surface mask on the resonator optical fiber, the surface mask including a primary masked ring substantially covering the resonator segment between unmasked rings on the first and second segments of the resonator optical fiber.

52. The method of claim 51, wherein the unmasked rings are produced by laser machining of a resonator optical fiber outer coating layer.

53. The method of claim 51, wherein the surface mask includes a secondary masked ring adjacent the primary masked ring with a secondary unmasked ring therebetween, the primary masked ring being wider than the secondary masked ring, the secondary masked ring being wider than the secondary unmasked ring, so that upon etching of the resonator fiber an axially-displaced fiber-taper positioning-and-support structure is produced on the resonator optical fiber adjacent the fiber-ring resonator, the positioning-and-support structure including a radially-extending radially-tapered transverse flange.

54. The method of claim 53, wherein the positioning-and-support structure extends completely around the resonator optical fiber.

55. The method of claim 53, wherein the positioning-and-support structure subtends an angle less than about 180°.

56. The method of claim 53, wherein the positioning-and-support structure subtends an angle greater than about 45°.

57. The method of claim 53, wherein the positioning-and-support structure is greater than about 10 $\mu$m in length.

58. The method of claim 53, wherein the positioning-and-support structure is greater than about 50 $\mu$m in length.

59. The method of claim 53, wherein the positioning-and-support structure is less than about 500 $\mu$m in length.

60. The method of claim 53, wherein the positioning-and-support structure is less than about 150 $\mu$m in length.

61. The method of claim 50, wherein:
the resonator fiber is a silica-based optical fiber;
the surface mask comprises portions of a hermetic carbon outer coating layer of the resonator optical fiber; and
the etching employs an aqueous-hydro-fluoric-acid-based etchant.

62. The method of claim 50, further comprising the step of removing at least a portion of the surface mask from the resonator optical fiber after etching.

63. The method of claim 50, further comprising the step of leaving at least a portion of the surface mask remaining on the first segment or the second segment of the resonator optical fiber after etching, the remaining portion of the surface mask serving as an optical mode suppressor.

64. The method of claim 50, further comprising the step of a second surface-masked wet etch, wherein a second surface mask includes an unmasked ring on the resonator segment between masked rings on the resonator segment, so that upon etching of the resonator fiber a radially-displaced fiber-taper positioning-and-support structure is produced on a circumference of the fiber-ring resonator, the positioning-and-support structure including paired axially-juxtaposed radially-extending radially-tapered transverse flanges.

65. The method of claim 25, further comprising the step of adjusting an optical resonance frequency of the fiber-ring resonator after fabricating the fiber-ring resonator on the resonator optical fiber.

66. The method of claim 65, wherein the adjusting step includes irradiating the fiber-ring resonator with ultra-violet light thereby altering the resonance frequency by altering a refractive, index of the fiber-ring resonator.

67. The method of claim 65, wherein the adjusting step includes doping the fiber-ring resonator thereby altering the resonance frequency by altering a refractive index of the fiber-ring resonator.

68. The method of claim 65, wherein the adjusting step includes etching the fiber-ring resonator thereby altering the resonance frequency by altering a diameter of the fiber-ring resonator.

69. The method of claim 65, wherein the adjusting step includes depositing optical material on the fiber-ring resonator thereby altering the resonance frequency by altering a diameter of the fiber-ring resonator.

70. The method of claim 25, further comprising the step of providing a radially-extending transverse flange on the first segment or the second segment of the resonator optical fiber, the flange being adapted for engaging a corresponding groove in an alignment housing.

71. The method of claim 25, further comprising the step of providing a circumferential groove on the first segment or the second segment of the resonator optical fiber, the groove being adapted for engaging a corresponding flange in an alignment housing.

72. A method for fabricating multiple fiber-ring resonators on a resonator optical fiber, the fiber-ring resonators each comprising a transverse fiber-ring resonator segment integral with the resonator optical fiber and separated from each adjacent resonator fiber segment by an intervening fiber segment, the multiple fiber-ring resonators being positioned between first and second segments of the resonator optical fiber, the resonator segments each having a circumferential optical path length sufficiently different from a circumferential optical path length of at least one adjacent intervening segment of the resonator optical fiber so as to enable the multiple resonator segments to support at least one resonant optical mode of a resulting coupled-optical-resonator system near an outer circumferential surface of the resonator segments, the method comprising the steps of:
rotating the resonator optical fiber about a longitudinal relative rotation axis thereof relative to a processing tool; and
spatially selectively applying the processing tool to at least a portion of a surface of the resonator optical fiber thereby producing a difference between the circumferential optical path length of the resonator segments and the circumferential optical path length of the intervening segments of the resonator optical fiber.

73. The method of claim 72, wherein applying the processing tool includes removing material from intervening segments of the resonator optical fiber so that the radii of the resonator segments are sufficiently larger than the radii of the intervening segments of the resonator fiber so as to enable the multiple resonator segments to support at least one resonant optical mode of a resulting coupled-optical-resonator system near an outer circumferential surface of the resonator segments.

74. The method of claim 73, wherein material is removed from the resonator optical fiber by surface masked wet etching of the resonator optical fiber.

75. The method of claim 74, further comprising the step of producing a surface mask on the resonator optical fiber, the surface mask including multiple masked rings substantially covering the multiple resonator segments between multiple unmasked rings on the intervening segments of the resonator optical fiber.

76. The method of claim 72, wherein the multiple fiber-ring resonators include at least four fiber-ring resonators.

77. The method of claim 72, wherein a spectral width of a resonance band of the coupled-optical-resonator system is smaller than an optical channel spacing of the optical WDM system.

78. The method of claim 72, wherein comprising wherein a spectral width of a resonance band of the coupled-optical-resonator system is substantially equal to an optical channel spacing of the optical WDM system.

79. The method of claim 72, wherein a spacing between spectrally-adjacent resonance bands of the coupled-optical-resonator system is greater than an optical channel spacing of the optical WDM system.

80. The method of claim 72, wherein spectrally-adjacent resonance bands of the coupled-optical-resonator system are spaced by about an integer times an optical channel spacing of the optical WDM system.

81. The method of claim 80, wherein the optical WDM system is an optical DWDM system having a channel spacing less than about 400 GHz.

82. The method of claim 80, wherein spectrally-adjacent resonance bands of the coupled-optical-resonator system are spaced by about twice the optical channel spacing of the optical WDM system.

83. The method of claim 72, wherein:
each of the multiple fiber-ring resonators has substantially the same width, substantially the same diameter, and substantially the same de-coupled resonance frequency; and
each intervening segment has substantially the same width and substantially the same diameter.

84. The method of claim 83, wherein the intervening segments are greater than about 1 $\mu$m in width.

85. The method of claim 83, wherein the intervening segments are less than about 20 $\mu$m in width.

86. The method of claim 83, wherein:
the intervening segments are between about 5 $\mu$m and about 15 $\mu$m in width; and
the intervening segments are less than about 0.7 $\mu$m smaller in radius than the resonator segments.

87. The method of claim 83, wherein:
the intervening segments are between about 1 $\mu$m and about 5 $\mu$m in width; and
the intervening segments are greater than about 1 $\mu$m smaller in radius than the resonator segments.

88. A method for fabricating a fiber-taper alignment-and-support structure on a fiber-taper support fiber, the fiber-taper alignment-and-support structure comprising a taper-support segment integral with the fiber-taper support fiber between first and second segments of the fiber-taper support fiber, the taper-support segment being adapted for substantially reproducibly and substantially stably positioning a fiber-taper engaged therewith, the method comprising the steps of:
rotating the taper-support optical fiber about a longitudinal relative rotation axis thereof relative to a processing tool; and
spatially selectively applying the processing tool to at least a portion of a surface of the taper-support optical fiber thereby producing the fiber-taper alignment-and-support structure on the taper-support segment of the taper-support optical fiber.

89. The method of claim 88, wherein the positioning-and-support structure extends completely around the taper-support optical fiber.

90. The method of claim 88, wherein the positioning-and-support structure subtends an angle less than about 180°.

91. The method of claim 88, wherein the positioning-and-support structure subtends an angle greater than about 45°.

92. The method of claim 88, wherein the positioning-and-support structure is greater than about 10 $\mu$m in length.

93. The method of claim 88, wherein the positioning-and-support structure is greater than about 50 $\mu$m in length.

94. The method of claim 88, wherein the positioning-and-support structure is less than about 500 $\mu$m in length.

95. The method of claim 88, wherein the positioning-and-support structure is less than about 150 $\mu$m in length.

96. The method of claim 88, wherein applying the processing tool to the taper-support optical fiber includes removing material from the immediately adjacent portions the first segment or the second segment of the taper-support optical fiber so that a radially-extending transverse flange results.

97. The method of claim 96, wherein material is removed from the taper-support optical fiber by surface-masked wet etching of the taper-support optical fiber.

98. The method of claim 97, further comprising the step of producing a surface mask on the taper-support optical fiber, the surface mask including a primary masked ring on the taper-support segment between unmasked rings on the first and second segments of the taper-support optical fiber.

99. The method of claim 98, wherein the unmasked rings are produced by laser machining of a taper-support optical fiber outer coating layer.

100. The method of claim 98, wherein the surface mask further includes an unmasked ring on the taper-support segment between masked rings on the taper-support segment, so that upon etching of the taper-support fiber a fiber-taper positioning-and-support structure is produced on the taper-support fiber, the positioning-and-support structure including paired axially-juxtaposed radially-extending radially-tapered transverse flanges.

101. The method of claim 97, wherein:
the taper-support fiber is a silica-based optical fiber;
the surface mask comprises portions of a hermetic carbon outer coating layer of the taper-support optical fiber; and
the etching employs an aqueous-hydro-fluoric-acid-based etchant.

102. The method of claim 97, further comprising the step of removing at least a portion of the surface mask from the taper-support optical fiber after etching.

103. The method of claim 97, further comprising the step of leaving at least a portion of the surface mask remaining on the first segment or the second segment of the taper-support optical fiber after etching, the remaining portion of the surface mask serving as an optical mode suppressor.

104. The method of claim 88, wherein applying the processing tool to the taper-support optical fiber includes removing material from the taper-support segment of the taper-support optical fiber so that a circumferential groove results.

105. The method of claim 104, wherein material is removed from the taper-support optical fiber by surface-masked wet etching of the taper-support optical fiber.

106. The method of claim 105, further comprising the step of producing a surface mask on the taper-support optical fiber, the surface mask including a primary unmasked ring on the taper-support segment between masked rings on the first and second segments of the taper-support optical fiber.

107. The method of claim 105, wherein:

the taper-support fiber is a silica-based optical fiber;

the surface mask comprises portions of a hermetic carbon outer coating layer of the taper-support optical fiber; and the etching employs an aqueous-hydro-fluoric-acid-based etchant.

108. The method of claim 105, further comprising the step of leaving at least a portion of the surface mask remaining on the first segment or the second segment of the taper-support optical fiber after etching, the remaining portion of the surface mask serving as an optical mode suppressor.

109. The method of claim 88, further comprising the step of providing a radially-extending transverse flange on the taper-support optical fiber, the flange being adapted for engaging a corresponding groove in an alignment housing.

110. The method of claim 88, further comprising the step of providing a circumferential groove on the taper-support optical fiber, the groove being adapted for engaging a corresponding flange in an alignment housing.

* * * * *